United States Patent
Wong et al.

(10) Patent No.: US 11,564,155 B2
(45) Date of Patent: Jan. 24, 2023

(54) APPARATUS AND METHODS FOR INTERWORKING IN WIRELESS NETWORKS

(71) Applicant: Charter Communications Operating, LLC, St. Louis, MO (US)

(72) Inventors: Curt Wong, St. Louis, MO (US); Yildirim Sahin, Englewood, CO (US); Maulik Vaidya, Escondido, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/842,352

(22) Filed: Apr. 7, 2020

(65) Prior Publication Data

US 2021/0314858 A1    Oct. 7, 2021

(51) Int. Cl.
*H04W 48/18* (2009.01)
*H04W 88/06* (2009.01)
(Continued)

(52) U.S. Cl.
CPC ........... *H04W 48/18* (2013.01); *H04W 8/183* (2013.01); *H04W 48/16* (2013.01); *H04W 80/04* (2013.01);
(Continued)

(58) Field of Classification Search
CPC combination set(s) only.
See application file for complete search history.

(56) References Cited

U.S. PATENT DOCUMENTS 6,859,435 B1    2/2005  Lee et al.
9,204,269 B1 *  12/2015 Cham ................ H04L 65/1073
(Continued)

FOREIGN PATENT DOCUMENTS

WO    WO-2018031327 A1    2/2018
WO    WO-2020198494 A3    11/2020
WO    WO-2021163601 A1    8/2021

OTHER PUBLICATIONS

Deering, S., et al., "Internet Protocol, Version 6 (IPv6) Specification", Internet Engineering Task Force (IETF) RFC 2460, Dec. 1998, 39 pages.
(Continued)

*Primary Examiner* — German Viana Di Prisco
(74) *Attorney, Agent, or Firm* — Patent Beach PC

(57) ABSTRACT

Apparatus and methods for interworking a user device in one or more wireless networks. In one embodiment, the apparatus and methods provide enhanced wireless services which enable operation of a given user device (e.g., a mobile 3GPP-compliant UE) within two or more mobile networks (e.g., PLMNs), such as a macro network and micro network. In one implementation, the UE contains multiple SIM cards to enable connection to different networks simultaneously. Accordingly, the UE can roam between two different networks seamlessly, regardless of whether the operators of each are independent or the same operator. Enhanced network capability as described herein advantageously allows for interworking between the macro and micro (e.g., small-cell) layers of the system without complicated network configuration requirements between the two operating networks as required under the prior art.

21 Claims, 25 Drawing Sheets

(51) Int. Cl.
*H04W 88/16* (2009.01)
*H04W 80/04* (2009.01)
*H04W 48/16* (2009.01)
*H04W 8/18* (2009.01)
*H04W 92/02* (2009.01)

(52) U.S. Cl.
CPC ........... *H04W 88/06* (2013.01); *H04W 88/16* (2013.01); *H04W 92/02* (2013.01)

(56) References Cited

U.S. PATENT DOCUMENTS

| | | |
|---|---|---|
| 11,057,865 B1 | 7/2021 | Curt |
| 2012/0028592 A1 | 2/2012 | Pick et al. |
| 2012/0033612 A1 | 2/2012 | Jazra |
| 2014/0105028 A1* | 4/2014 | Bhaskaran ........ H04W 56/0035 370/242 |
| 2014/0226606 A1* | 8/2014 | Nishigori ............. H04W 76/32 370/329 |
| 2014/0281390 A1 | 9/2014 | Boland et al. |
| 2014/0286170 A1 | 9/2014 | Ericson et al. |
| 2014/0293860 A1 | 10/2014 | Hegde |
| 2014/0301193 A1 | 10/2014 | Liu et al. |
| 2015/0195754 A1* | 7/2015 | Zhang ............... H04W 36/0055 370/331 |
| 2015/0359036 A1 | 12/2015 | Seo et al. |
| 2016/0219607 A1 | 7/2016 | You et al. |
| 2016/0227540 A1 | 8/2016 | Chen et al. |
| 2016/0241362 A1 | 8/2016 | El-Khamy et al. |
| 2017/0164234 A1* | 6/2017 | Kalapatapu .......... H04W 28/08 |
| 2017/0244651 A1 | 8/2017 | Saxton |
| 2017/0311247 A1* | 10/2017 | Qi ..................... H04W 28/0284 |
| 2017/0359759 A1* | 12/2017 | Brown ................. H04W 48/12 |
| 2018/0288657 A1* | 10/2018 | Stojanovski .......... H04W 36/14 |
| 2019/0045487 A1 | 2/2019 | You et al. |
| 2019/0124633 A1 | 4/2019 | Hang et al. |
| 2019/0356743 A1* | 11/2019 | Park ..................... H04L 67/141 |
| 2019/0357117 A1 | 11/2019 | Cudak et al. |
| 2020/0008224 A1 | 1/2020 | Ozturk et al. |
| 2020/0053622 A1 | 2/2020 | Huang-Fu et al. |
| 2020/0068481 A1* | 2/2020 | Kim ........................ H04W 8/08 |
| 2020/0196199 A1* | 6/2020 | Sharma ................ H04W 48/16 |
| 2020/0221464 A1* | 7/2020 | Nielsen ................ H04L 5/1469 |
| 2020/0260330 A1 | 8/2020 | Zhu et al. |
| 2020/0314851 A1 | 10/2020 | Vaidya et al. |
| 2020/0342311 A1* | 10/2020 | Peroulas ............. H04W 12/121 |
| 2021/0014791 A1 | 1/2021 | Freda et al. |
| 2021/0029608 A1* | 1/2021 | Dodd-Noble ........... H04W 8/26 |
| 2021/0235465 A1 | 7/2021 | Meylan et al. |
| 2021/0258822 A1 | 8/2021 | Mukherjee et al. |
| 2021/0392615 A1 | 12/2021 | Wong et al. |

OTHER PUBLICATIONS

"Internet Protocol, DARPA Internet Program, Protocol Specification", IETF RCF 791, Sep. 1981, 50 pages.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
Author Unknown, Enhancements for SI Transmission on NR-U, Document No. R2-1816608, 2018, pp. 1-3.
Author Unknown, Enhancements for SI Transmission on NR-U, Document No. R2-1816835, 2018, pp. 1-3.
Author Unknown, Extended, Overlapping SI-windows in NR-U, Document No. R2-1815048, 2018, pp. 1-4.
Author Unknown, System Information Enhancements for NR-U, Document No. R2-1816267, 2018, pp. 1-4.
Author Unknown, SI Design in NR-U, Document No. R2-1817325, 2018, pp. 1-2.
Author Unknown, SI Update in NR-U, Document No. R2-1816314, 2018, pp. 1-2.

* cited by examiner

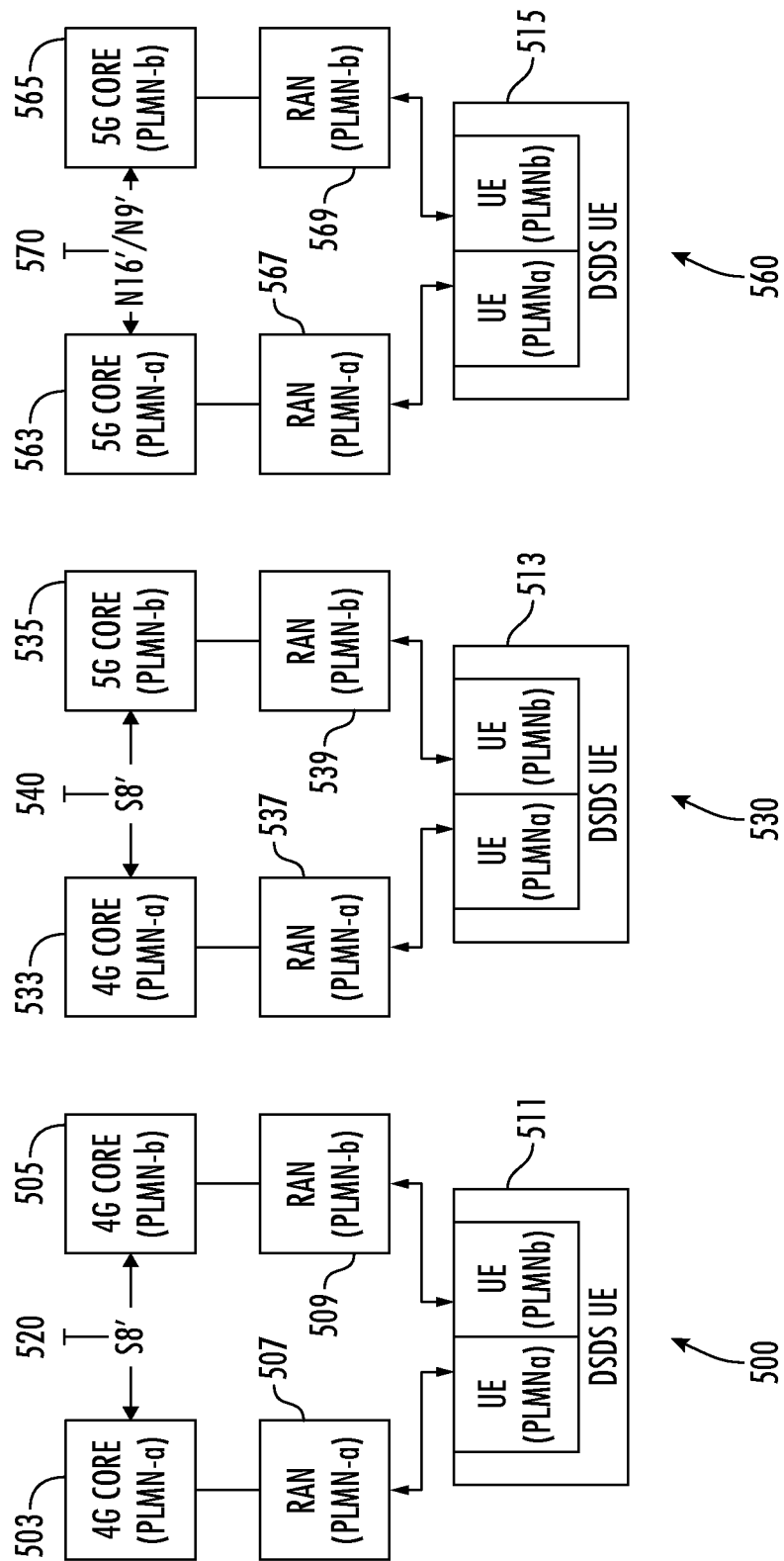

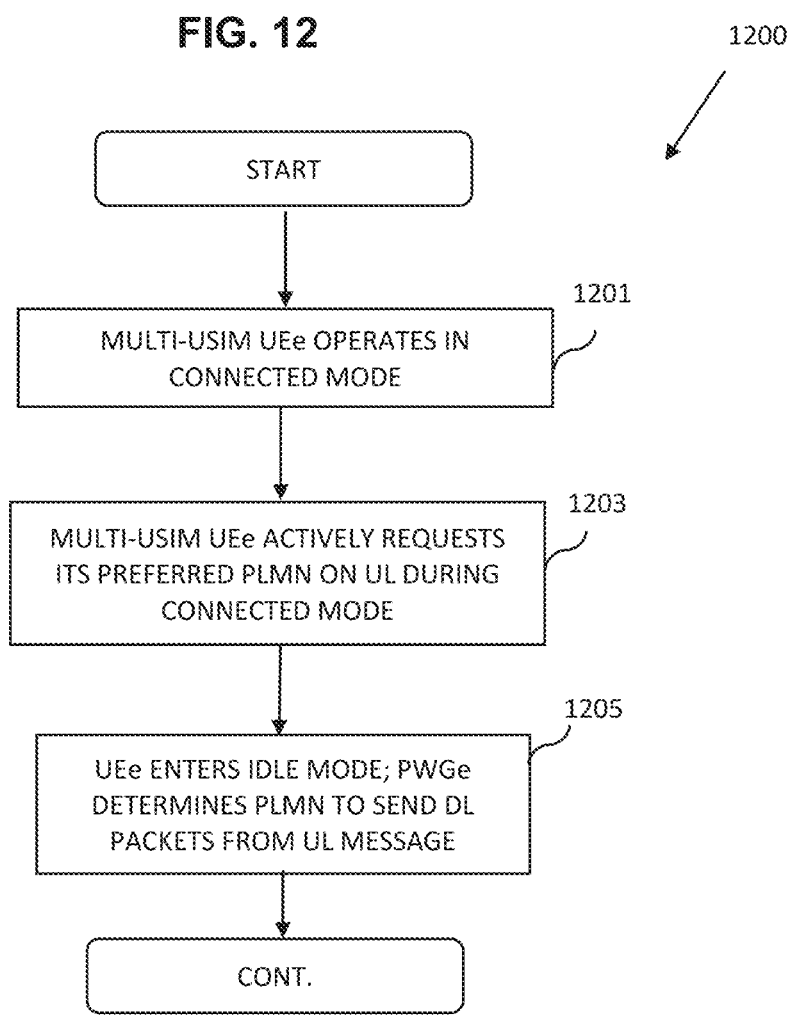

APPARATUS AND METHODS FOR INTERWORKING IN WIRELESS NETWORKS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to maintaining session continuity across two mobile networks.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, small cells, etc. that are within wireless range.

5G New Radio (NR) and NG-RAN (Next Generation Radio Area Network)

NG-RAN or "NextGen RAN (Radio Area Network)" is part of the 3GPP "5G" next generation radio system. 3GPP has specified Release 16 NG-RAN (and is currently working on Release 17), its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core, also called "5GC").

The NG-RAN (5G) System architecture is designed to support data connectivity and services offering with higher throughput and lower latency. FIG. 1 shows the 5G architecture 100 as defined in 3GPP TS 23.501. 3GPP has also defined roaming architectures between two networks Home Public Land Mobile Network (HPLMN), and Visited Public Land Mobile Network (VPLMN) when the two PLMN have overlap in coverage area.

FIG. 2A shows the architecture 200 for roaming between HPLMN 203 and VPLMN 205 as defined in 3GPP TS 23.501, specifically the roaming architecture in the case of home routed scenario with serviced-bases interface within the Control Plane. In this architecture, the UE is connected to the Data Network (DN) 207 from the HPLMN, and all traffic is routed from the HPLMN via a DN gateway (not shown).

FIG. 2B shows architecture 230 similarly for roaming between HPLMN and VPLMN as defined in TS 23.501, specifically, the roaming architecture in the case of local breakout with service-based interface within Control Plane. In this architecture, UE is connected to the DN 209 from the VPLMN, and the traffic is transported between the UE and the DN 209 without traversing a DN gateway (not shown) in the home network. Additionally, in this architecture, the PCF 203 in VPLMN may interact with Application Function (AF) 213 in order to generate Policy and Charging Control (PCC) rules.

When a UE moves to somewhere not covered by its home network, the UE searches the other networks that provides coverage to communicate with. In the extant 5G or 3GPP cellular wireless systems, when a UE connects with another wireless Mobile Operating Network (MNO), the visited network identifies the UE home network. If there is a roaming agreement between the home network and the visited network, the UE is able to connect with the visited network.

Multi-SIM Devices and Unaddressed Issues Therewith—

Multi-SIM devices (e.g., 3GPP UEs), currently deployed commercially, provide a solution for situations when a UE roams from its home network (e.g., an HPLMN), and intends to connect to a visited network (e.g., VPLMN) that does not have roaming agreement with its home network. These Multi-SIM UEs support more than one user USIM (Universal Subscriber Identity Module)—typically two—where the USIMs may be associated with the same or different PLMNs. Additionally, each USIM provides a phone number and an identity for the device in order the enable functions such receiving or making calls/texts/data on each number.

Extant 3GPP specifications do not support any specific implementation of multi-USIM UEs. Hence, each network operator and UE manufacturer implements the Multi-USIM architecture and protocol differently, resulting in a variety of implementations and architectures.

As noted above, multi-USIM UEs are capable of connecting to multiple networks independently. The Dual-USIM, also referred to Dual-SIM Dual-Standby (DSDS) UEs are the most common commercially deployed multi-USIM devices. The Dual-USIM UEs are able to connect to a first network using a first USIM (USIM-A), and connect to a second network using a second USIM (USIM-B) independent of the connection maintained by USIM-A. To reduce the manufacturing cost of such UEs, the radio and baseband components are often shared between the two USIMs. However, in such cases, coordination logic is needed to manage the operation of two different USIMs, and to use the appropriate USIM with the associated network with which it is registered. For instance, while the UE is connected to the first network associated with USIM-A, in the cycle between data transmissions for that network, the UE needs to measure the received signal from the second network associated with USIM-B, monitor the paging channel, or read system information (e.g., SI blocks or SIBs) to, inter alia, maintain status of and determine the possibility of connecting to the second network.

A multi-USIM UE (e.g., DSDS UE) assumes an operating environment wherein the two networks associated with USIM-A and -B have an overlap in the coverage area; hence, a data application within the UE can be allocated to the appropriate network anytime when the UE is located in the coverage area of one of the networks. However, in an operating environment where one network has comparatively small and spotty coverage (e.g., a small-cell or femtocell network associated with USIM-A) while the other network has a wide and more uniform coverage area (e.g., a macrocell network associated with USIM-B), such data applications within the UE may not be able to be allocated to the appropriate network, since the coverage with the small-cell network may not be guaranteed. This situation requires special handling within the multi-USIM UE in order to provide a more seamless user experience.

In a typical enterprise wireless network scenarios, when a 4G 3GPP UE connects to Evolved Packet Core (EPC), the UE requires a data subscription. The data subscription data includes user identity and security credential data, and assigns the relevant Access Point Name (APN) to the private enterprise network to which the UE can connect via the related Packet Data Network Gateway (PGW). In other words, APN is used to identify the Packet Data Network (PDN) that a UE intends to communicate with.

In the case of a 3GPP 5G NR (New Radio) enterprise scenario, the Data Network Name (DNN) functions as the equivalent to the aforementioned APN in the Evolved Packet Service (EPS). The subscription data (identity and security credential data) is stored in the HSS (Home Subscriber Server), and also allocated to the UE.

The foregoing configurations raise particular issues with connectivity. For instance, if the enterprise subscription data in the above scenario is only stored in the HSS of the small cell network (i.e., the one associated with USIM-A in the above example), the multi-USIM UE can only connect to the private enterprise network when it is within the coverage of the small cell network. The macrocell network, associated with USIM-B, does not have any data connection to the private enterprise network; hence, when a UE moves outside the small cell network coverage, it will no longer have access to the private enterprise network via the macrocell network with which it must connect, even though the macrocell network can provide IP connectivity to the public Internet (e.g., via an Internet APN).

Moreover, as described above, extant 3GPP specifications do not provide association of a given multi-USIM UE with more than one PLMN at a time. Specifically, in the context of aforementioned VPLMN and HPLMN, a multi-USIM UE can maintain an RRC connection with 5G-NG RAN within only one PLMN. This limited connectivity results in session discontinuity when the multi-USIM UE roams between different networks.

Furthermore, for some applications, it is required that the multi-USIM UE maintains its IP address during the session, and with current limitations in the 3GPP specification, the UE cannot maintain a consistent IP address during the roaming between two different networks without use of complex and non-optimal link aggregation mechanisms. This places a significant restriction on the operation and architecture of the networks and the UE (including frustrating use of certain types of applications).

Accordingly, improved methods and apparatus are needed to enable, inter alia, session continuity for a UE roaming between respective different networks (and potentially different network operators), such as where one network is associated with a first PLMN (e.g. a small-cell network)) and the second network is associated with another, heterogeneous PLMN (e.g. a macrocell network). Specifically, such improved methods and apparatus would also ideally (i) allow a multi-USIM UE to roam between different networks seamlessly when one network has limited or spotty coverage areas, and (ii) maintenance of an assigned IP address by the UE across the two networks. Such improved methods and apparatus would also obviate use of complex and sub-optimal prior art link aggregation methods and architectures.

SUMMARY

The present disclosure addresses the foregoing needs by providing, inter alia, methods and apparatus for providing enhanced multi-network connection and operation (including service/application support) for wireless mobile devices.

In a first aspect of the disclosure, a network architecture is disclosed. In one embodiment, the architecture comprises a home-routed internetworking model configured to maintain IP address and session continuity across different networks. In one variant, the architecture is applied within the same network operator (e.g., MNO or MSO). In another variant, the architecture is applied within different network operator (e.g., two different MNOs, two different MSOs, or between an MNO and MSO). In yet another variant, the architecture is adapted for use in a network sharing model (e.g., wherein two or more entities share at least portions of the infrastructure for their respective users or customers).

In another aspect of the disclosure, methods and apparatus enabling enhanced internetworking between two mobile networks are disclosed. In one embodiment, the methods and apparatus are implemented between a 3GPP 4G/4.5G (LTE/LTE-A) network and a 3GPP 5G NR network. In another embodiment, the methods and apparatus are implemented between a first 3GPP 4G/4.5G (LTE/LTE-A) network and a second different 4G/4.5G (LTE/LTE-A) network.

In yet another embodiment, the methods and apparatus are implemented between two different 3GPP 5G NR networks.

In one variant, a mobile device (e.g., DSDS-capable UE) belongs to a first PLMN (e.g., an MSO small-cell based network), while a second PLMN is used to provide additional (overlapping) network coverage.

In a further aspect of the disclosure, methods and apparatus for maintaining data session continuity across two or more networks are described. In one embodiment, session continuity is maintained in concert with IP address maintenance, such that a same IP address can be used by a given UE across the networks thereby allowing for maintaining e.g., IPSec or similar tunnels or other processes which rely on a uniform IP address, and obviating other mechanisms such as link aggregation processes or servers. For instance, because the IP address of the UE is not changed when the UE switches over from one PLMN to another, there is no need to re-establish the IPsec tunnel.

In yet a further aspect of the disclosure, methods and apparatus for utilizing a common gateway process across two or more mobile networks are described. In one embodiment, a same PGW (packet gateway) within one of the e.g., two PLMNs is used to provide packet interface with a common DSDS UE, regardless of which PLMN the UE utilizes. This use of a common gateway simplifies the infrastructure that would otherwise be required, and also provides inter alia, an accurate packet data usage quota/count, and can also enable triggering of warnings (e.g., via SMS) or other such functions if needed.

In yet another aspect of the disclosure, methods and apparatus for enabling cross-network naming or identifier functionality across two or more mobile networks are described. In one embodiment, heterogeneous access point name (APN) servicing can be maintained across the different PLMNs. For example, an IMS (IP Multimedia Subsystem) APN can continue to use a PGW associated with a first network, while another APN such as an Internet APN is directed to a PGW associated with the second network. Hence, in this embodiment, a first PLMN may use one or more services from a different PLMN while having all other data services associated with a "home" PGW obtained via the first PLMN.

In a further aspect of the disclosure, a computerized mobile device configured for use within multiple mobile network environments is disclosed. In one embodiment, the computerized mobile device includes: digital processor apparatus; first wireless interface apparatus in data communication with the digital processor apparatus and configured for wireless communication with a first radio area network (RAN) utilizing a first wireless access technology; second wireless interface apparatus in data communication with the digital processor apparatus and configured for wireless communication with a second RAN utilizing a second wireless access technology; and storage apparatus in data communication with the digital processor apparatus and comprising a storage medium, the storage medium comprising at least one computer program.

In one variant, the at least one computer program is, configured to, when executed on the digital processor apparatus: establish data communication with a first network management entity associated with the first RAN, the first network management entity associated with a first network operator and a first mobile network; and establish data communication with a second network management entity associated with the second RAN, the second network management entity associated with a second network operator and a second mobile network.

In one implementation, the first wireless access technology comprises a 3GPP Long Term Evolution (LTE)-based technology, and the second wireless access technology comprises a 3GPP Fifth Generation New Radio (5G-NR)-based technology. In one such scenario, the first mobile network comprises a home public land mobile network (HPLMN) of the computerized mobile device, and the second mobile network comprises a public land mobile network (PLMN) which the computerized mobile device is visiting (VPLMN). Alternatively, the 5G network may be the HPLMN, while the LTE network is VPLMN.

In another variant, the at least one computer program is configured to, when executed by the digital processor apparatus, perform the establishment of data communication with the first network management entity associated with the first RAN, and the establishment of data communication with the second network management entity associated with the second RAN contemporaneously, such that at least a portion of the data communication between the computerized mobile device and the first network management entity temporally overlaps with at least a portion of the data communication between the computerized mobile device and the second network management entity.

In another variant, the computerized mobile device further includes subscriber identity module logic in data communication with the data processor apparatus, the subscriber identity module logic configured to provide data enabling the establishment of the data communication with the first network management entity as well as establishment of the data communication with the second network management entity. In one implementation, the subscriber identity module logic are part of a common Universal Subscriber Identity Module (USIM) having two discrete SIM data sets.

In another variant, the data enabling the establishment of the data communication with the first network management entity includes data relating to a first land mobile network (LMN), and the data enabling the establishment of the data communication with the second network management entity includes data relating to a second land mobile network (LMN).

In a further variant, the computerized mobile device comprises a 3GPP-compliant user equipment (UE); the first land mobile network (LMN) includes a visited public land mobile network (VPLMN) for the UE; and the second land mobile network (LMN) includes a home public land mobile network (HPLMN) for the UE.

In yet another variant, the first network management entity and the second network management entity are not affiliated or federated.

In another aspect of the disclosure, an enhanced UE (user equipment) apparatus, or $UE_e$, for use within a wireless network is disclosed. In one embodiment, the $UE_e$ includes both 4G/4.5G E-UTRAN-based and 5G NR-based wireless interfaces and associated protocol stacks so as to support both: (i) DSDS (Dual SIM Dual Standby) operation, and (ii) multi-network (e.g., multi-PLMN) operation.

In another aspect of the disclosure, network apparatus for use within a wireless network is disclosed. In one embodiment, the network apparatus includes an enhanced PGW (Packet Data Network Gateway) or $PGW_e$, and is configured to at least recognize prescribed 4G/5G-related cross-network migration or transition signals from the enhanced UE ($UE_e$) so as to enable setup of a multi-network operation environment including support of the aforementioned home-routed internetworking model.

In one variant, the network apparatus includes a PGW (Packet Data Network Gateway) process configured to at least recognize one or more prescribed 3GPP 4G/5G based network migration or transition signals generated from one or more 3GPP 4G/5G compliant UE (user equipment) to enable simultaneous operation of the UE associated with first and second distinct land mobile networks (LMNs).

In another variant, the data interface in a transmission to the network management entity process associated with the first LMN results in the network management entity process not cancelling an extant connection of the UE with another core network entity.

In one implementation of this variant, the network apparatus includes a 3GPP Long Term Evolution (LTE) Mobility Management Entity (MME) process, the network management process includes a 3GPP compliant HSS (Home Subscriber Service) entity, a Packet Data Network Entity (PWG), and another 5G NR entity comprises an AMF (Access and Mobility Management Function).

In another embodiment, the enhanced Packet Data Network Entity (PGWe) is configured to be aware of a second PLMN (SPLMN) communicating with the $UE_e$, thereby allowing the $UE_e$ to be allocated and maintain the same IP address when communicating to the second PLMN (and thereby enable setup of a multi-network operation environment).

In one implementation, the computerized network apparatus comprises computerized logic configured for data communication with both (i) an MME (Mobility Management entity) of an LTE network, and (ii) an AMF (Access and Mobility Management Function) of a 5G NR network.

In an additional aspect of the disclosure, computer readable apparatus is described. In one embodiment, the apparatus includes a storage medium configured to store one or more computer programs, and includes a program memory or HDD or SSD on a computerized device such as the aforementioned PGWe.

In another embodiment, the computer readable apparatus comprises a first USIM (Universal Subscriber Identity Module), which is configured to contain a first PLMN identifier relevant to maintaining connection with a first PLMN, a second USIM, which is configured to contain a second PLMN identifier relevant to maintaining connection with the second PLMNs.

In yet another aspect, a system is disclosed. In one embodiment, the system includes (i) an PGWe (ii) a IMSI/IP address database in communication with the PGWe each associated with a first PLMN. The PGWe is configured to establish communication with a GW process of another PLMN (e.g., via an S8' interface) to coordinate maintenance of a uniform or common IP address for a UE having the first PLMN as its home network while using the second PLMN.

In a further aspect, a method of operating a mobile device so as to maintain connection to two or more different PLMNs is disclosed.

In another aspect, a method of operating a mobile device so as to maintain a common session and IP address across two or more different PLMNs is disclosed.

In yet another aspect, a method of operating a wireless network infrastructure is disclosed. In one embodiment, the method includes: identifying a first registration of a user device within the wireless network infrastructure, the wireless network infrastructure operated by a first network operator; receiving data relating to a second registration of the user device within a second wireless network infrastructure operated by a second network operator; identifying a second registration of a user device within the wireless network infrastructure; and enabling routing of IP packet data between the networks so as to maintain session continuity for transitions between the first and second infrastructures.

In still a further aspect, methods and apparatus for enabling service continuity between a first type of mobile network configuration and a second type of mobile network configuration are disclosed. In one embodiment, the first type of network is a small-cell based network operated by a first type of operator (e.g., MSO), and the second type of network is a macrocell cellular network operated by a second type of operator (e.g., MNO). The small-cell network includes one or more enterprise-related functions, and users/subscribers of the small-cell network/MSO are enabled to access the enterprise-related functions of their "home" network when roaming within the second (MNO) network. In one implementation, the coverage areas of the small-cell based network.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In yet a further aspect, a method of accessing small-cell (e.g., enterprise) network functionality via a macrocell network is disclosed. In one embodiment, the method includes: associating a wireless user device with the macrocell network's infrastructure; identifying a gateway function of a small-cell network as a routing entity for one or more packet data processes; assigning the wireless user device an IP address via at least the identified packet gateway function; and establishing a packet data session using at least the allocated IP address, the packet data session utilizing the small-cell network (enterprise) function.

These and other aspects shall become apparent when considered in light of the disclosure provided herein.

BRIEF DESCRIPTION OF THE DRAWINGS

FIG. 5A is a block diagram of the first exemplary embodiment of a home-routed interworking architecture, as implemented between two 4G networks.

FIG. 5B is a block diagram of the second exemplary embodiment of a home-routed interworking architecture, as implemented between a 4G and 5G network.

FIG. 5C is a block diagram of the third exemplary home-routed interworking architecture, as implemented between two 5G networks.

FIG. 12 is a flowchart illustrating a first embodiment of a method for paging a multi-USIM UE roaming between PLMNs according the present disclosure.

FIGS. 3-19 © Copyright 2019-2020 Charter Communications Operating, LLC.

Figure 1:
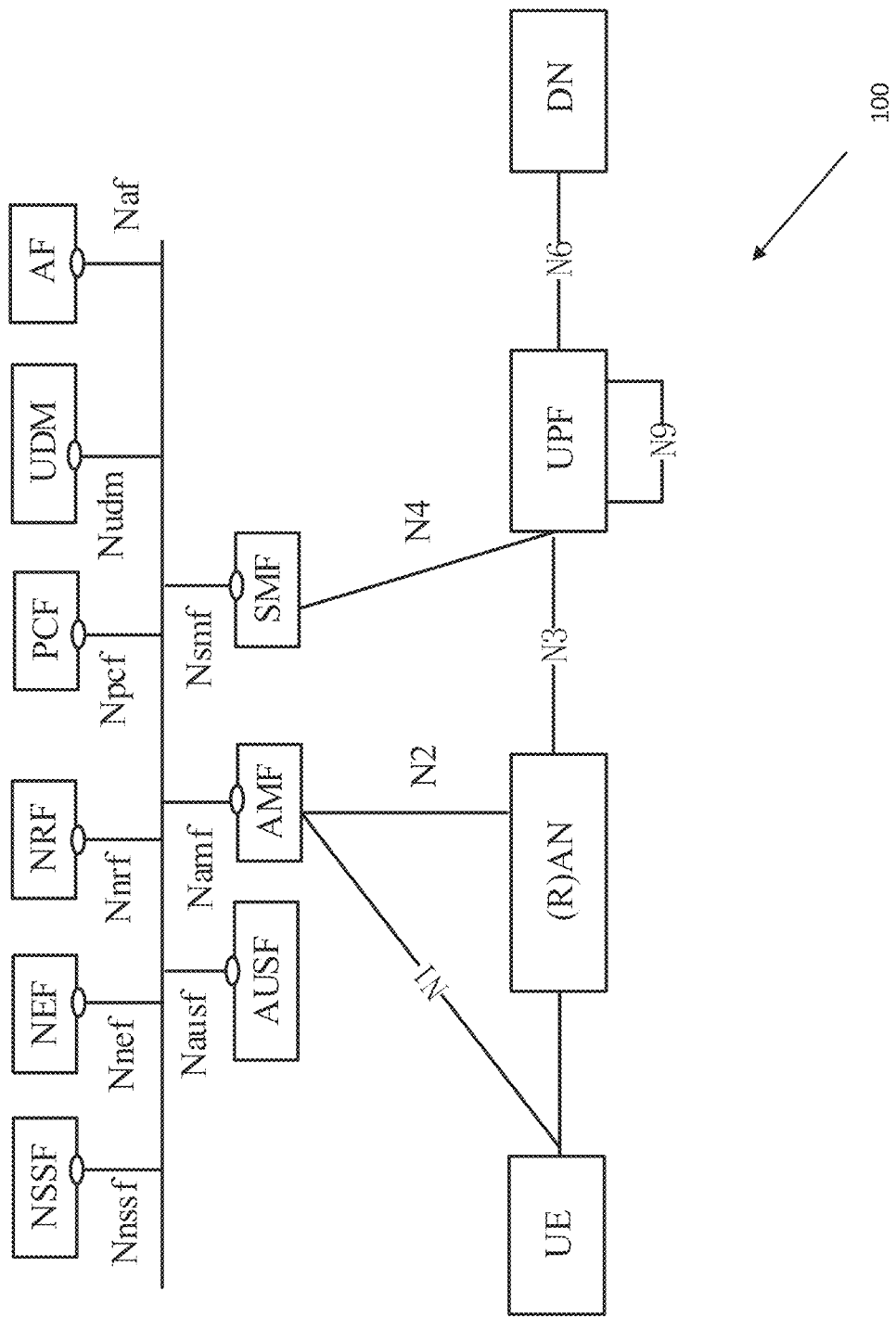
FIG. 1 is a functional block diagram of a prior art 5G system architecture and the various components thereof.
Figure 2A:
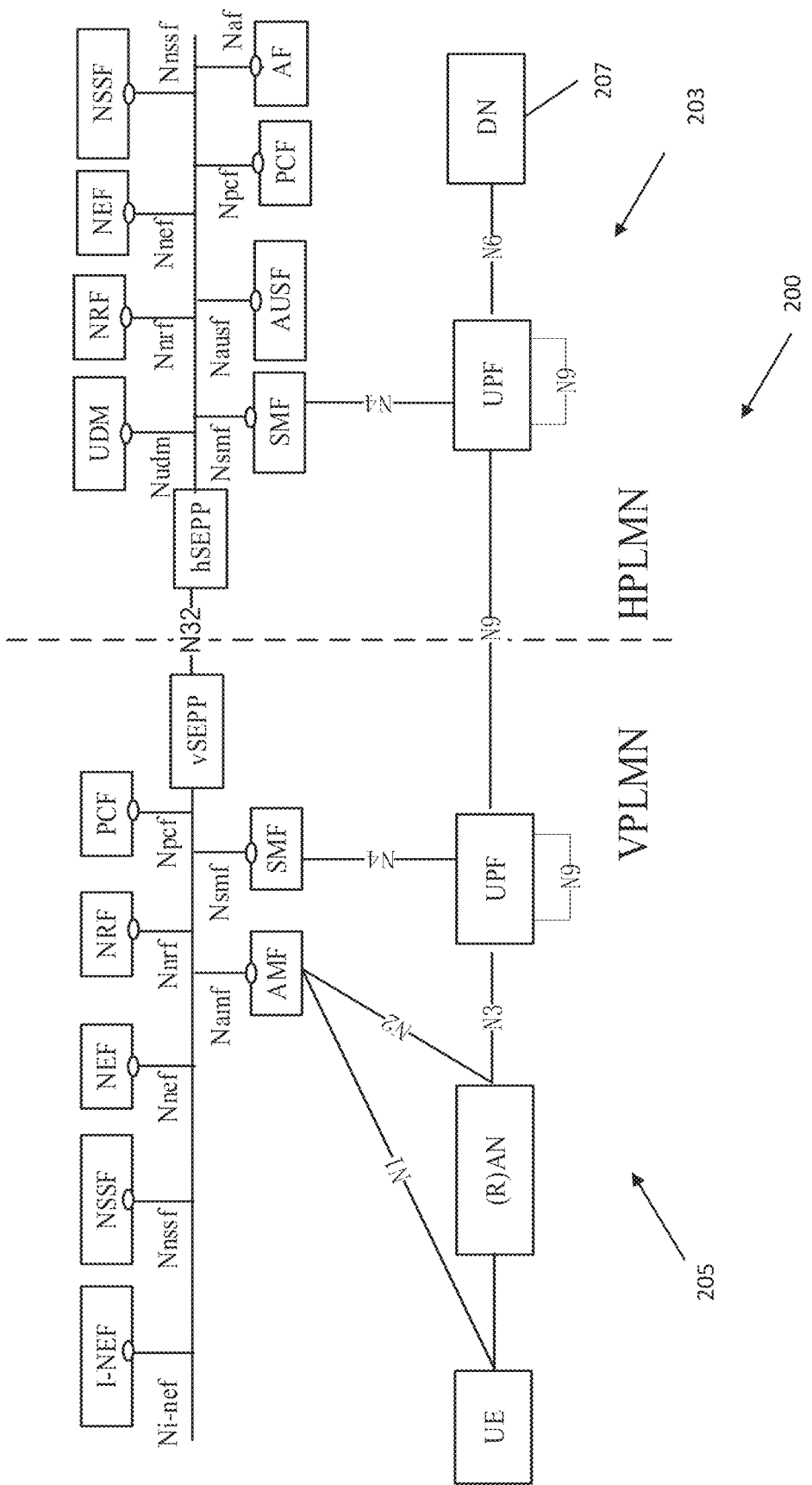
FIG. 2A is a block diagram showing the prior art 5G home-routed architecture as defined in 3GPP TS 23.501.
Figure 2B:
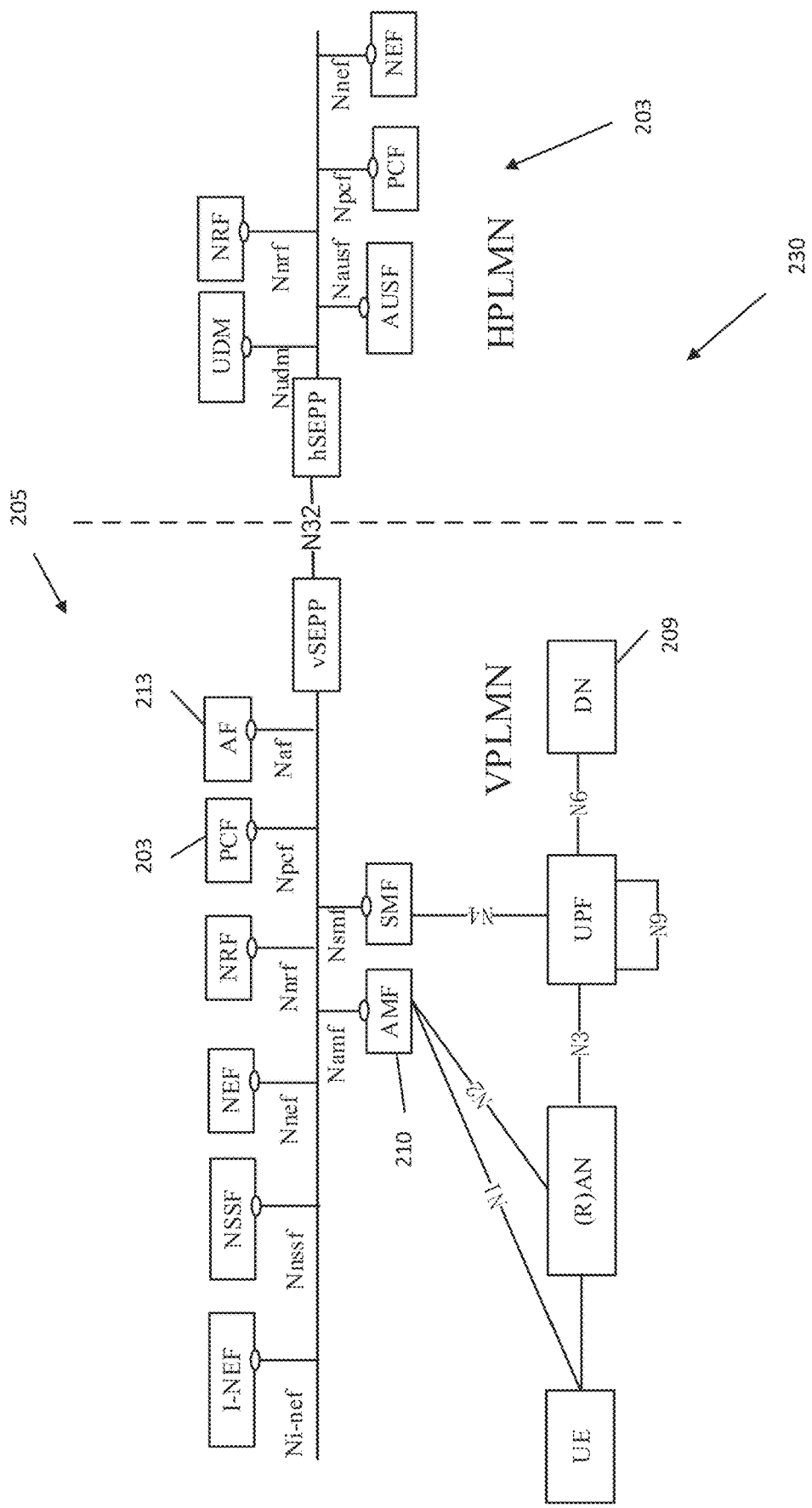
FIG. 2B is a block diagram showing the prior art 5G local breakout architecture as defined in 3GPP TS 23.501.

All rights reserved. Other Figures © Copyright of their respective copyright holders.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a 3GPP eNB or gNB, femtocell, small-cell, or CBRS CBSD.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., mmWave or 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "xNB" refers to any 3GPP-compliant node including without limitation eNBs (eU-TRAN) and gNBs (5G NR).

Overview

In one exemplary aspect, the present disclosure provides improved methods and apparatus for providing enhanced wireless services which, inter alia, enable seamless provision of packet data services of a given mobile device (e.g., a 3GPP-compliant UE) across two or more mobile networks (e.g., PLMNs), including those of respective different operators and/or those of different types (e.g., small-cell-based network with enterprise functionality and limited "spot" coverage, versus macrocell "cellular" networks with broad coverage).

In one embodiment, the prior art single-SIM network sharing model is extended so as each network can share its (overlapping) coverage area with the other network with respect to an enhanced multi-SIM UE (UEe) operating therein under an improved home-routed roaming model. With such enhancements, a multi-USIM UE can operate in both PLMNs (e.g., a "visited" or secondary PLMN, and a Home PLMN) simultaneously and preserve services such as enterprise-related packet data functions (including maintenance of uniform IP addressing) which would otherwise be interrupted in the transition from one network to another.

In various implementations of the enhanced home-routed roaming model above, the multi-SIM UEe can advantageously roam seamlessly between two different 4G networks, between a 4G and a 5G, and between two 5G networks, while maintaining a common IP address (and any sessions predicated thereon).

For instance, in one use case, a private entity may operate a small-cell based, enterprise network with 5G compatibility, within the coverage footprint of an MNO-based "macro" cellular network with 4G/5G compatibility. As such, the two entities can share their networks coverage while preserving the enterprise network functionality of the small-cell network; i.e., the MNO can assume the role of the visited or secondary PLMN, while the private network assumes the role of the HPLMN. The enhanced Multi-USIM UEe as described herein can accordingly maintain seamless session continuity and service access when transitioning between the two networks, in effect making the transitions between the two networks (e.g., when the UEe roams outside the "spot coverage" of the small-cell network) completely transparent to the user of the UEe.

Advantageously, only comparatively minor modifications to extant 4G/5G infrastructure (whether small-cell or macrocell) are required to support the foregoing functionality.

Detailed Description of Exemplary Embodiments

Exemplary embodiments of the apparatus and methods of the present disclosure are now described in detail. While these exemplary embodiments are described in the context of the previously mentioned wireless access networks (e.g., 5GS and ECS) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of networks providing service to a customer or consumer or end user or subscriber (i.e., within a prescribed service area, venue, or other type of premises), the present disclosure may be readily adapted to various types of environments including, e.g., outdoors, commercial/retail, or enterprise domain (e.g., businesses), or even governmental uses. Yet other applications are possible.

Moreover, the various aspects of the disclosure may be utilized consistent with various types of radio frequency spectrum (as well as the underlying RAT technologies), including licensed, unlicensed (e.g., LTE-U or LTE-LAA, or NR-U), or "quasi-licensed" spectrum such as CBRS spectrum. Such spectrum types may be mixed as well, such as where a small-cell based network operates with unlicensed or quasi-licensed spectrum, and the macrocell network utilizes licensed spectrum.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Network Sharing and Interworking Architecture for Multi-USIM UE—

Referring now to FIGS. 5A-5C, exemplary embodiments of the improved network sharing and interworking architecture of the present disclosure are shown and described.

However, as a brief aside, it is instructional to first review extant approaches to network sharing and interworking, including present approaches to IP address "link aggregation."

Figure 3:
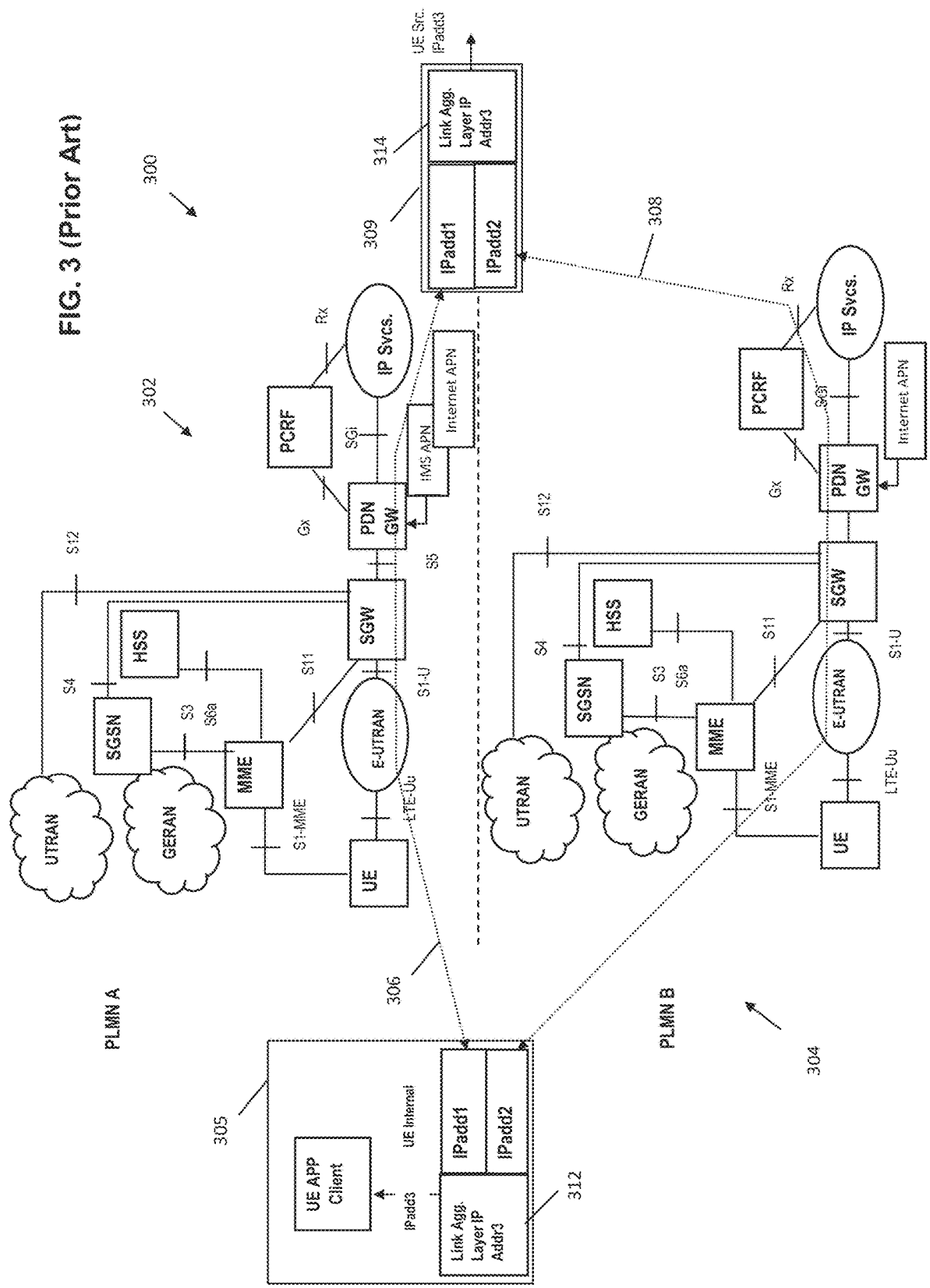
FIG. 3 is a block diagram showing the prior art link aggregation architecture for maintaining a multi-USIM UE IP address across PLMNs.

FIG. 3 is a functional block diagram illustrating a prior art link aggregation configuration and method for maintaining IP address "continuity" across two different PLMNs. It will be appreciated that, as discussed below, the term "continuity" in this context is somewhat of a misnomer; rather, the IP address associated with a given prior art UE when roaming between two PLMNs in fact changes. Hence, the term IP address "tracking" is more descriptive.

As, shown in FIG. 3, in the typical prior art link aggregation method 300, individual packets are sent from/to a client 305 to/from a server 309 via different links (e.g., via PLMN A 302, PLMN B 304). In this architecture, in order to maintain IP address continuity across two different PLMNs, the aggregation client 312 in the UE only see a single IP address (IP add3), and the corresponding aggregation process 314 in the server 309 also only sees the UE's IP address as IP add3. However, the intervening PLMNs operate with their own particular assigned IP addresses (i.e., IP add1 and IP add2) as shown. As previously noted, this use of different IP addresses within the different PLMNs can result in loss of session continuity and other undesirable artifacts.

In this architecture, the total packet count is also performed by the Link aggregation entity 314 of the server, such as to trigger quota warming messages (e.g., via SMS). As a brief aside, in the exemplary 3GPP architecture, packet count is normally performed at the Packet GW, and hence having another entity (such as the aggregation function 314 shown in FIG. 3) also perform packet counting adds duplication of functionality in the network, which is undesirable.

Figure 4A:
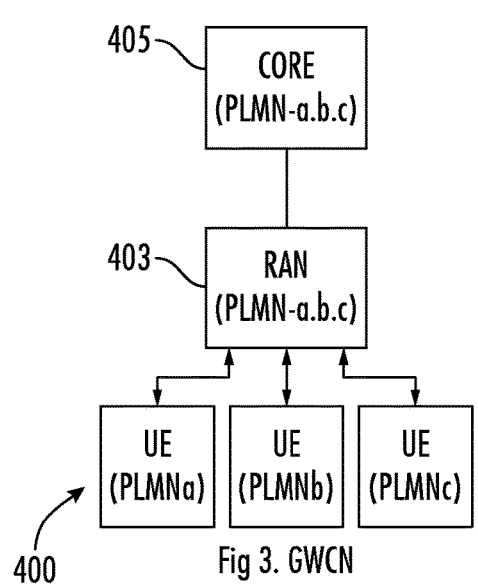
FIG. 4A is a block diagram showing the prior art GWCN network sharing architecture defined in 3GPP TS 23.251.
Figure 4B:
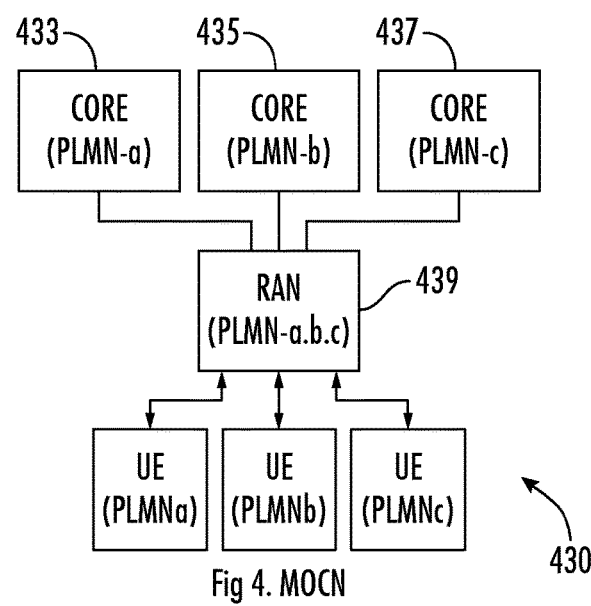
FIG. 4B is a block diagram showing the prior art MOCN network sharing architecture defined in 3GPP TS23.251.

Referring now to FIG. 4A-4B, the network sharing models defined in 3GPP TS 23.251 (e.g., v 15.10) are illustrated. Specifically, FIG. 4A illustrates the prior art Gateway Core Network (GWCN) network sharing architecture 400, in which Radio Access Node (RAN) 403 as well as Core Network (CN) node 405 are shared by different network operators (such as different MNOs). Under the GWCN configuration, only 4G (LTE) infrastructure can be share.

FIG. 4B illustrates the prior art Multi-Operator Core Network (MOCN) network sharing architecture 430, in which multiple CN nodes 433, 435, and 437 are connected to the same RAN 439, and the CN nodes are operated by different network operators. Under the MOCN configuration, both 4G and 5G infrastructure can be shared.

Note that in the foregoing architectures 400, 430, individual UE utilize individual SIMs for access to their respective core functions (via a common RAN 403, 439).

With the foregoing as a backdrop, exemplary embodiments of the improved methods and apparatus of the present disclosure are now described.

Referring now to FIG. 5A, a high-level functional block diagram of an exemplary embodiment of home-Routed Interworking configuration between two 4G networks according to the present disclosure is shown and described. Specifically, as shown in FIG. 5A, the architecture 500 includes one or more enhanced UE (UEe) 511 having DSDS configuration and multiple USIMs, two 4G RANs 507 and 509, two distinct 4G cores 503, 505 (e.g., EPCs), as well as notably two (2) distinct PLMNs (here, PLMN-a and PLMN-b), although it will be appreciated that configurations with different numbers of and/or other types of RANs may be utilized consistent with the present disclosure in addition to those described subsequently herein. PLMN-a and PLMN-b may belong to the same or different network operators or types of operators (e.g, MNOs and/or MSOs, or other types of entities). In this exemplary embodiment, the UEe subscriber profile is configured in PLMN-b (the home PLMN or HPLMN) 509. PLMN-a 507 (the VPLMN) "shares" its coverage with PLMN-b when the UEe leaves the HPLMN.

Also present in the architecture of FIG. 5A is a modified S8 interface (denoted as S8') 520. As a brief aside, the extant S8 interface within 3GPP standards is an inter-PLMN reference point providing user and control plane connectivity between the Serving GW (SGW) in the VPLMN and the PDN GW (PGW) in the HPLMN. As such, S8 is effectively the "inter-PLMN" version of the S5 interface. In the present embodiment, as described in greater detail subsequently herein, the new S8' interface is used to support the various sharing and "home routed" IP address continuity functions provided by the inventive architecture(s) utilizing 4G networks.

The multi-USIM UEe 511 (described subsequently herein in detail) is configured to operate within the two 4G RANs 507, 509, 4G/5G RAN 537, 539 5G RANs 567, 569 whether individually or concurrently. In the exemplary use case or operational scenario, the UEe 511 is configured such that it can form radio technology connections with the associated RANs (i.e., form an RRC connection with the HPLMN RAN, and a similar connection with the VPLMN RAN) via relevant portions of its protocol stack and wireless interfaces and corresponding SIM data, including simultaneously. Furthermore, the UEe 511 is configured to maintain IP session and IP address continuity during roaming between its HPLMN and VPLMN. In one such scenario, the VPLMN provides expanded (shared) coverage for the HPLMN, the former comprising for example a macrocell network of an MNO, and the latter comprising a micro- or small-cell network of e.g., an MSO.

Referring now to FIG. 5B, a high-level functional block diagram of another exemplary embodiment of a home-Routed Interworking configuration is illustrated, in this case between a 4G and 5G network. Specifically, as shown in FIG. 5B, the architecture 530 includes one or more 4G RANs 537 and 5G RANs 539, respective cores 533, 535, as well as two (2) distinct PLMNs. The DSDS UEe 513 in this case includes USIMs for the different 4G/5G networks, as well as an S8' interface of the type referenced previously. As with the prior embodiment, PLMN-a and PLMN-b may belong to the same or different operators (e.g, MNOs, MSOs, or other). In this exemplary embodiment, the UEe subscriber profile is again configured to reside within PLMN-b (the HPLMN) 539.

FIG. 5C illustrates yet another exemplary embodiment of a home-Routed Interworking configuration according to the disclosure, in this case between two 5G networks. Specifically, as shown in FIG. 5C, the architecture 560 includes one or more first 5G RANs 567 and second 5G RAN(s) 569, respective 5G cores 563, 565 (e.g., 5GCs), as well notably two (2) distinct PLMNs (here, PLMN-a and PLMN-b), although it will be appreciated that configurations with different numbers of and/or other types of RANs may be utilized consistent with the present disclosure. The DSDS UEe 515 in this case includes USIMs for the different 5G/5G networks, as well as a modified N16/N9 interface (N16'/N9'). As a brief aside, the N16 interface is a VSMF (SMF of visited network) to HSMF (SMF of home network interface), while the N9 interface is a VUPF-HUPF interface. Accordingly, modified versions of each are utilized within the architecture 560 of FIG. 5C to support the home-routed functionality as described in greater detail below.

As with the prior embodiments, PLMN-a and PLMN-b may belong to the same or different operators (e.g, MNOs, MSOs, or other). In this exemplary embodiment, the UEe subscriber profile is again configured to reside within PLMN-b (the HPLMN) 539

Figure 6:
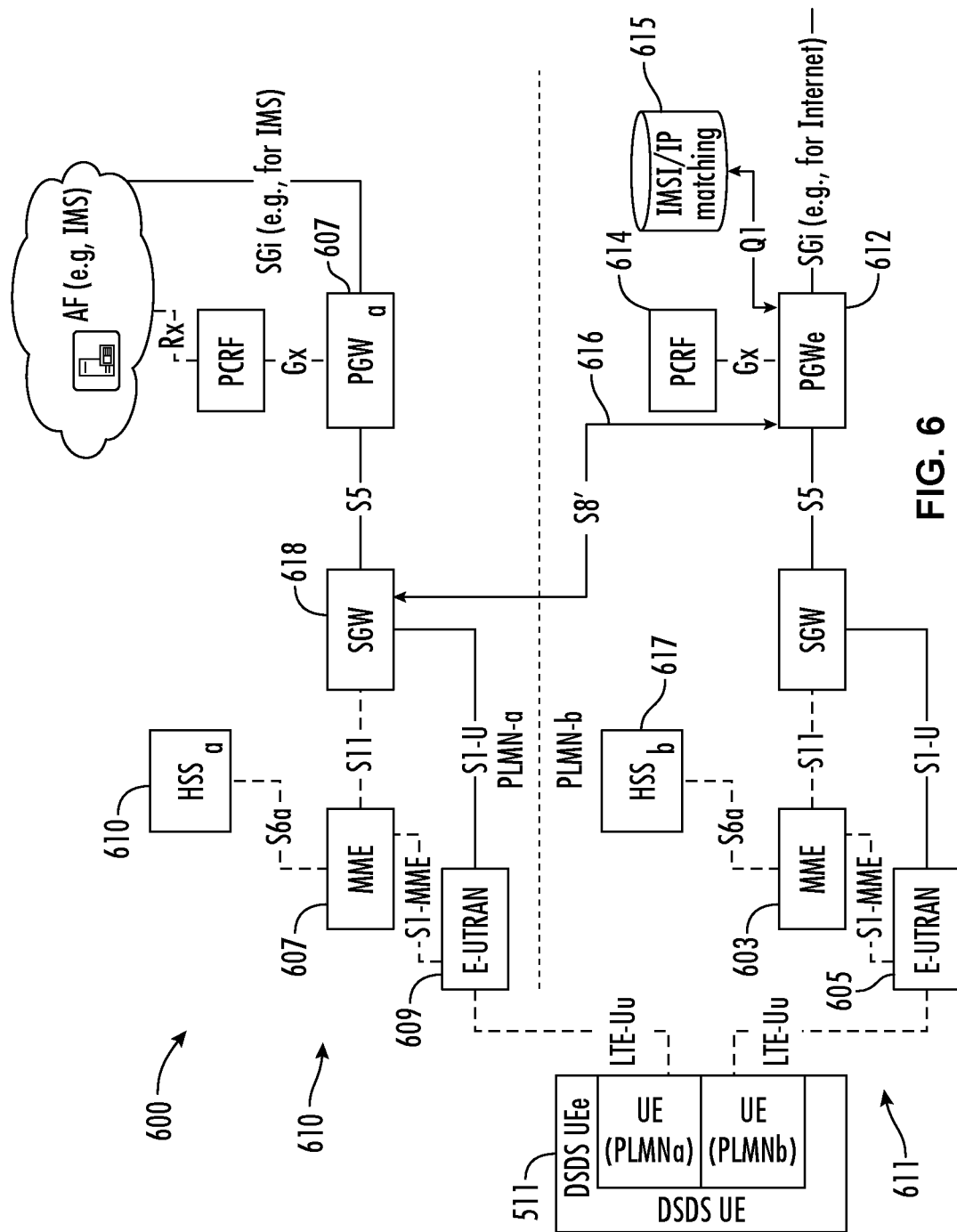
FIG. 6 is a block diagram of one embodiment of an enhanced E-UTRAN/E-UTRAN home-routed architecture according the present disclosure.

FIG. 6 is a functional block diagram of an exemplary embodiment of an enhanced home-routed network architecture 600 according to the present disclosure, wherein PLMN-b 611 (the UEe's HPLMN in this example) includes the 4G RAN 505 of FIG. 5A supra, and PLMN-a 610 (VPLMN in this example) includes the 4G RAN 503 (maintained by different or same MNO or MSO). Additional necessary infrastructure (PGWs 607, 612, PCRFs 614, HSS 610, 617, etc.) to support UEe operation are contained therein, including for scenarios where PLMN-a 610 acts as a VPLMN. The UEe 511 connects to its home 4G E-UTRAN 605, MME 603, as well as the 4G E-UTRAN 609, and MME 607 of the VPLMN 610.

Notably, the configuration of FIG. 6 also includes an enhanced PGW (PGWe 612) within PLMN-b 611 configured to support the home-routed functionality previously referenced. Note also that as illustrated by the vertical line 616 in FIG. 6, the S8' interface between the SGWa (PLMN-a) 618 and the PGWe 612 is created in support of the foregoing functions. In operation, the S8' interface may be used to, inter alia, retrieve UEe registration information, subscription and IP address data from an IMSI/IP database 615, and return this information to PLMN-a via its SGW 618. The inventive Q1 interface shown between the PGWe 612 and the database 615 is utilized to enable such accesses.

The IMSI/IP database is disposed in the architecture 600 associated with PLMN-b 611 since the UEe 511 is also "at home" in PLMN-b, although it will be appreciated that other database configurations may be used (including for example use of a shared database infrastructure, one operated by a third party, or even one within the VPLMN 610 which maintains data on UEe associated with PLMN-b as their home, such as by virtue of agreement or contractual arrangement between the operators of the different PLMNs, or where both PLMNs are operated by a common entity.

Moreover, it will be appreciated that the PGWe and IMSI/IP-based architecture used for the HPLMN of FIG. 6 may be mirrored within other networks, such as within PLMN-A 610. For instance, PLMN-a 610 may also be configured as a "home" network for its UEe's, and include e.g., enterprise and/or small-cell functionality. As such, the present disclosure contemplates cases where (i) the two PLMNs 610, 611 are heterogeneous in architecture, capability, and/or IP data functions supported, and (ii) the two PLMNs 610, 611 are homogeneous (or substantially homogeneous) in architecture, capability, and/or IP data functions supported, whether or not operated by the same or different network operators. As but one example, two adjacent or overlapping MSO-operated PLMNs with small-cell coverage could cooperate under the various mechanisms described herein to afford subscribers of each different PLMN common features within the other's network, including coverage in areas where the subscriber's home PLMN does not cover.

Figure 7:
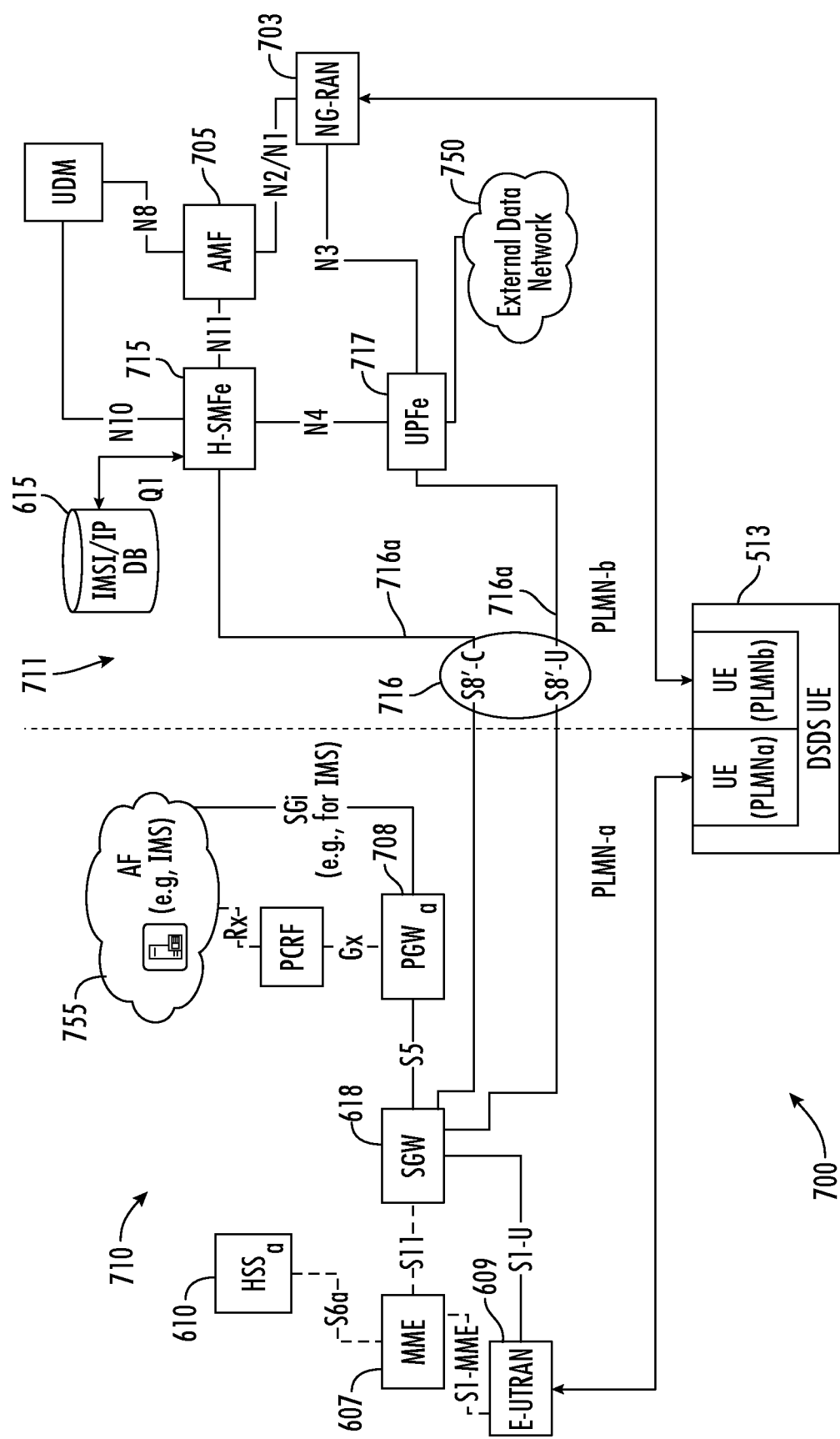
FIG. 7 is a block diagram of an embodiment of an enhanced E-UTRAN/5G home-routed network architecture according the present disclosure.

FIG. 7 is a functional block diagram of another exemplary embodiment of an enhanced home-routed network architecture 700 according the present disclosure, wherein PLMN-b (HPLMN in this example) is a 5G network including a 5G NG-RAN 703, AMF 705, enhanced UPF (UPFe) 717, and enhanced H-SMF (H-SMFe) 715.

PLMN-a (the VPLMN 710 in this example) is a 4G network including 4G RAN, MME 697, HSS 610, and SGW 618 of the type previously described. The UEe 513 connects to its home 5G NG-RAN 703 and AMF 705 as well as 4G E-UTRAN 609 and MME 607 via respective USIMs of the DSDS UEe 513. As with FIG. 6, an IMSI/IP database 615 and Q1 interface is also utilized in conjunction with the H-SMFe.

The architecture 700 of FIG. 7 also includes an AF (application function, such as 3GPP IMS) 755 within the VPLMN and communicative with the PCRF as shown.

In this embodiment, the S8' interface 716 is also comprised of both a user-plane sub-interface 716a and control-plane sub-interface 716b, terminated respectively between the SGW 618 and the UPFe and H-SMFe, respectively. These sub-interfaces allow carriage of user- and control-plane data, respectively, associated with packet data sessions for the UEe(s) 513.

Also illustrated in the embodiment of FIG. 7 is an external data network 750 in data communication with the UPFe 717. For instance, an enterprise packet network (such as an Ethernet network or one using another wired or wireless protocol) transacts packet data (e.g., IP data) with the HPLMN 711 via the UPFe. In one variant, the EDN 750 may be supported or provided by the network operator such as an MSO supporting an enterprise or campus (e.g., a private or MSO-only network).

It will further be appreciated that while FIG. 7 is illustrated as the 5G network 711 having the IMSI/IP database and other enhancements, all or portions of such IMSI/IP DB and enhancements may be utilized within the 4G network 710 as opposed to within the 5G network. For example, in another configuration (not shown), the PGW 708 present in the 4G network infrastructure may be enhanced as described elsewhere herein, and have the IMSI/IP DB associated therewith, with the S8' interface(s) 716 terminating at the enhanced PGW (versus the SGW 618 as shown in FIG. 7).

Figure 8:
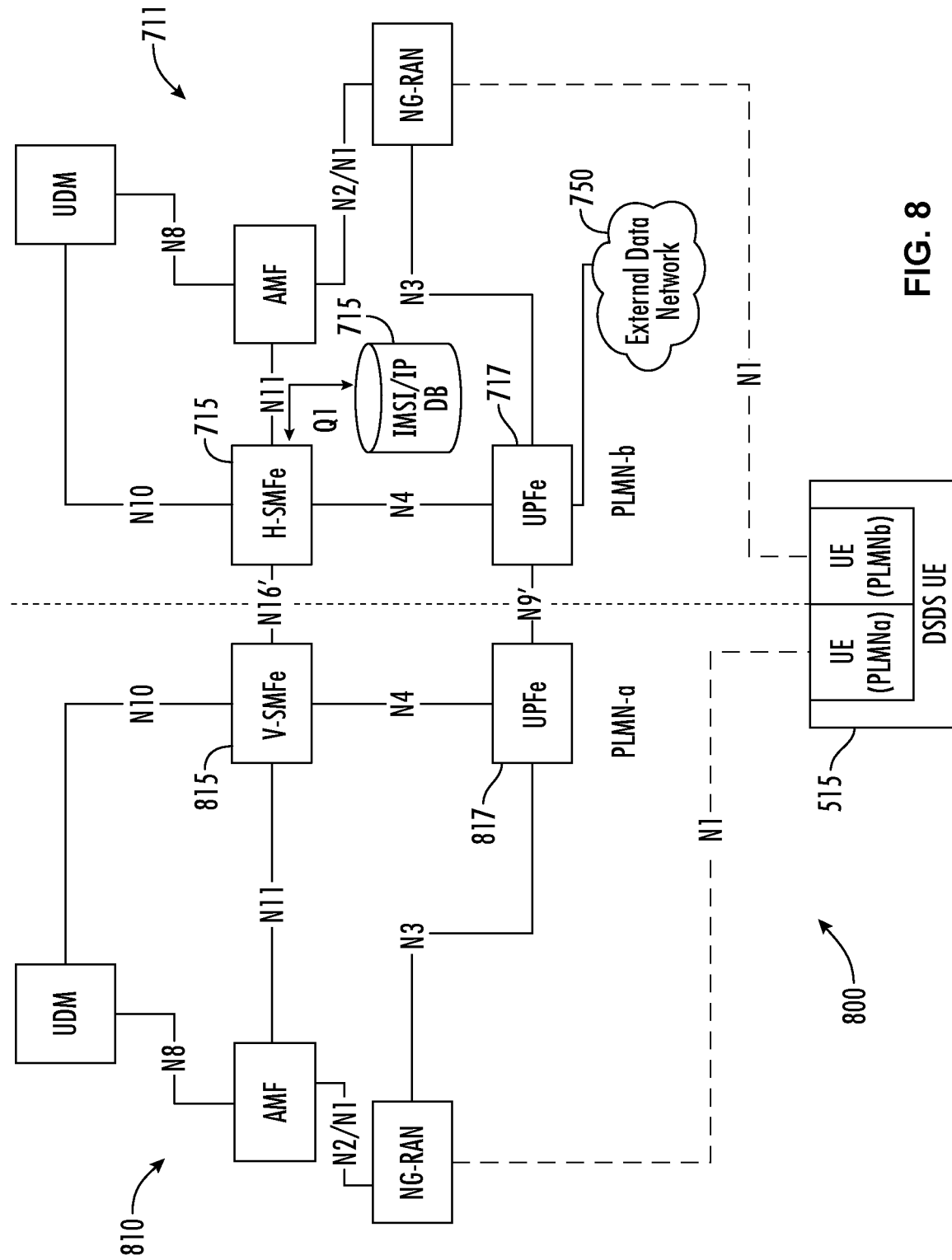
FIG. 8 is a block diagram of an embodiment of an enhanced 5G/5G home-routed network architecture according the present disclosure.

FIG. 8 is a functional block diagram of another exemplary embodiment of an enhanced home-routed network architecture 800 according the present disclosure, wherein PLMN-b 711 (the HPLMN in this example) is a 5G network, and PLMN-a 810 (VPLMN in this example) is also a 5G network (maintained by e.g., different or same MNO or MSO). In this architecture, the DSDS UEe 515 is configured to establish connection with each of the PLMNs 711, 810, and maintain IP/session continuity and home-routed service access via two counterpart UPFe processes 717, 817 (via an N9' interface) and two SMFe processes (H-SMFe 715 in the home network, and V-SMFe 815 in the VPLMN 810). As with FIGS. 6 and 7, an IMSI/IP database 615 and Q1 interface is also utilized in conjunction with the H-SMFe.

Moreover, while only one EDN 750 (in the HPLMN) is shown in FIG. 8, it will be appreciated that one or more such networks may be utilized within the VPLMN 810, such as for enterprise functions to be provided to home subscribers of PLMN-a 810 (as well as visiting subscribers from PLMN-b 711 in some configurations).

Figure 9:
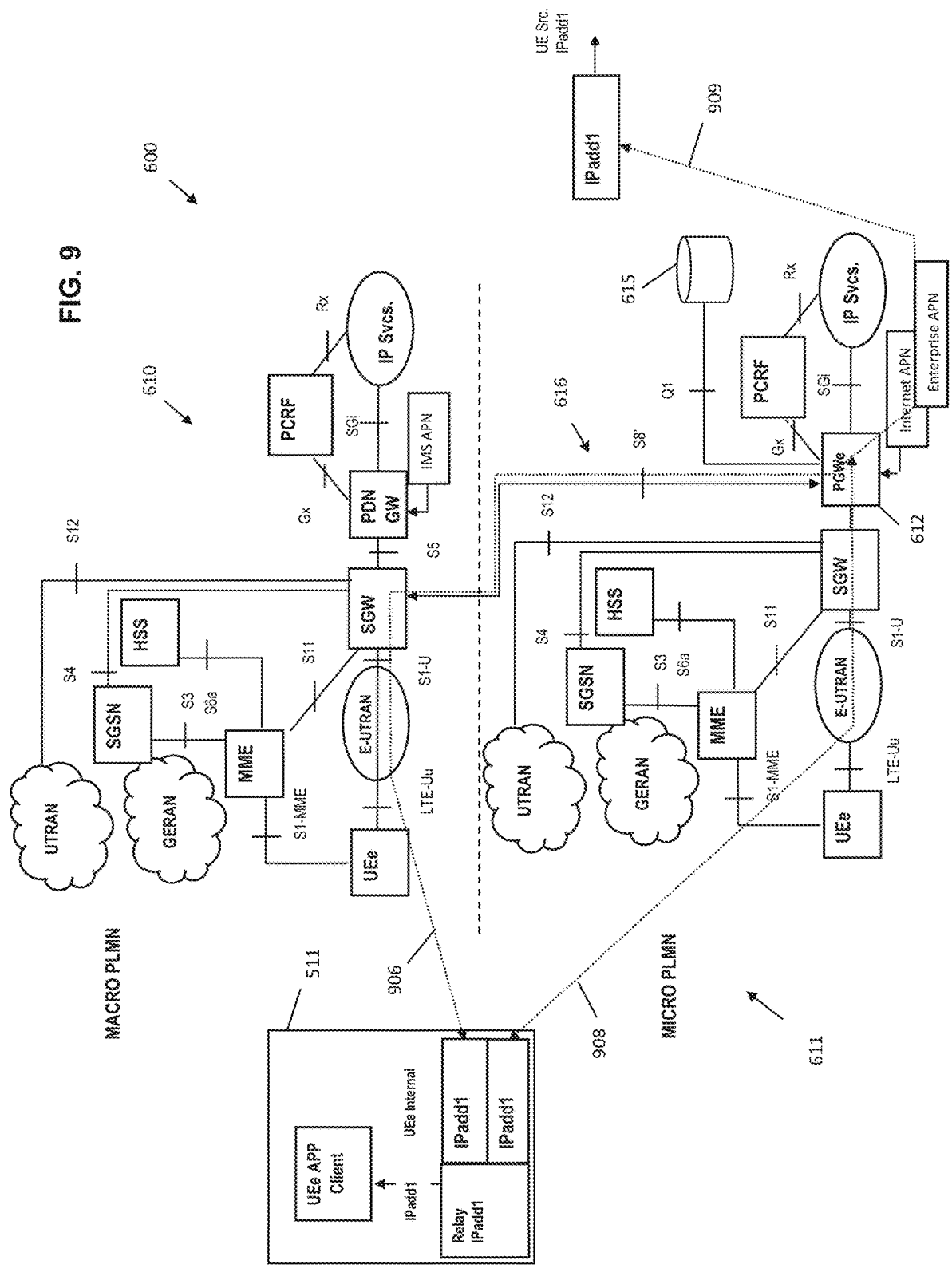
FIG. 9 is a block diagram of one embodiment of an architecture for maintaining a multi-USIM UE IP address across multiple PLMNs, according the present disclosure.

FIG. 9 is a functional block diagram illustrating one implementation of the architecture 600 of FIG. 6, configured so as to maintain IP address continuity across two different 4G networks. It will be appreciated that while FIG. 9 illustrates such IP address (and session) continuity across two 4G networks as in FIG. 6, the concepts are equally applicable to the architectures of FIG. 7 (4G-5G) and FIG. 8 (5G-5G).

As shown in FIG. 9, the UEe 511 maintain its IP address when it roams from PLMN-b 611 (here, a small-cell or "micro" PLMN) to PLMN-a 610 (here, a macrocell network) or vice versa, and hence there is no need to re-establish higher layer processes such as IPsec tunnels. Specifically, when the UEe 511 is associated with the RAN of its home PLMN 611, IP add1 is used, and packets are routed via the indigenous routes 908 and 909 as shown. In contrast, when roaming, the UEe utilizes the "visited" network route 906 for the IP packets (including through PLMN-a's SGW and the S8' interface), along with the "common" portion 909 of the UEe's home PLMN 611.

Also, whether the UEe is under the coverage area of PLMN-a or PLMN-b (or both, such as where the coverage areas of PLMN-b are "nested" within the larger macrocell coverage area of PLMN-a), the enhanced PDN Gateway (PGWe) 612 in PLMN-b provides connectivity between the UEe 511 and the EPC (not shown) by virtue of the S8' interface 616 between the SGW in PLMN-a 610 and the PGWe 612 in (home) PLMN-b 611. As such, the commonly addressed IP packets are "home routed" (i.e., via the PGWe 612 in the home network of the UEe 511), and consistent IP addressing is maintained end-to-end, regardless of whether the UEe is utilizing the visited RAN or its home RAN. This feature is in stark contrast to the prior art "link aggregation" approach of e.g., FIG. 3, wherein multiple IP addresses (i.e., IP add1, IP add2, and IP add3) are required under the roaming scenario. As such, no link aggregation process or address translation is required in either the UEe 511 or the distant IP packet server. The net result is that RAN transitions (e.g., from HPLMN to VPLMN or vice versa) are completely transparent to the carried IP data processes such as IPSec tunnels or VoIP or IMS sessions calls or the like—the user can literally hop back and forth between the coverage areas with complete continuity.

Methodology

1. Seamless Roaming Between PLMNs—

Referring now to FIGS. 10-12A various embodiments of the methods of seamless roaming between different wireless network according to the present disclosure, are shown and described in detail. It will be appreciated that while these methods are described primarily in the context of a 3GPP-based (i.e., E-UTRAN and/or 5G NR) architecture, the various methods are in no way so limited, and may be readily adapted and applied to other types or configurations of wireless such adaptation and application being within the skill level of the ordinary artisan given the present disclosure, including other applications where a UE or mobile device includes two different SIM or similar credentials and a capability of operation with two different RANs.

Figure 10:
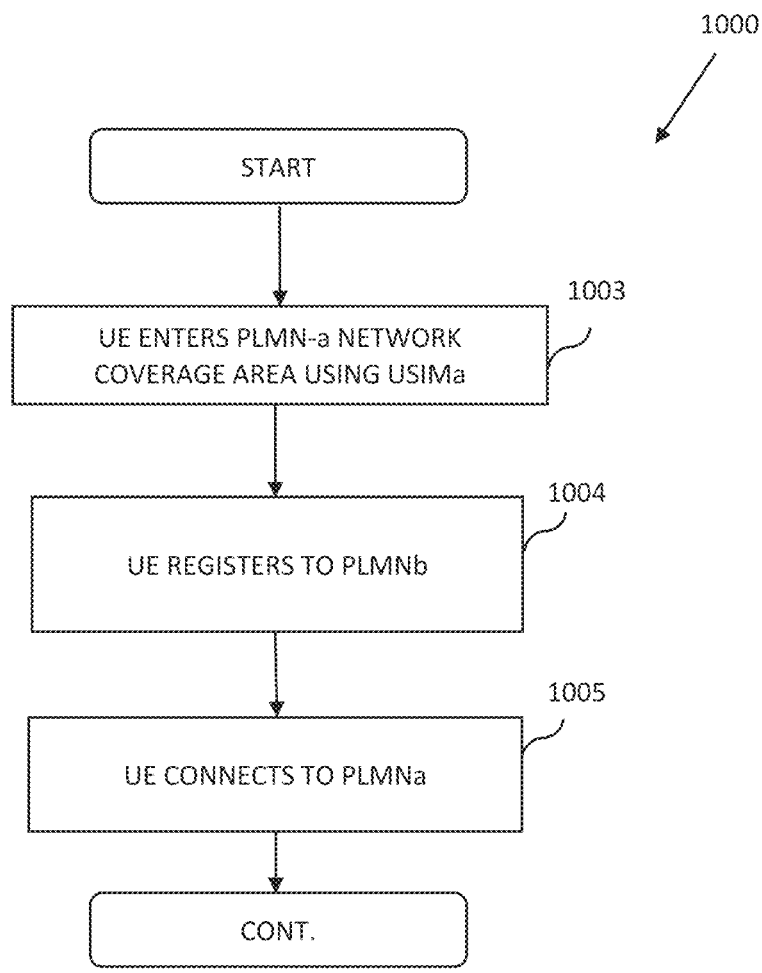
FIG. 10 is a flowchart illustrating a first embodiment of a generalized method for a multi-USIM UE roaming between PLMNs according the present disclosure.

FIG. 10 shows a first embodiment of the generalized method for seamless roaming of a multi-USIM UEe between two different wireless networks according to the present disclosure. It will be appreciated that while FIG. 10 is described in the context of two 4G networks with respect to the architecture 600 of FIG. 6, the concepts are equally applicable to the architectures 700, 800 of FIG. 7 (4G-5G) and FIG. 8 (5G-5G), respectively.

Per step 1003 of the method 1000, the UEe 511 enters the coverage area of the VPLMN (e.g., PLMN-a) network. As noted above, in some scenarios, the UEe may already be within the coverage area of the VPLMN, but using the RAN of its HPLMN (e.g., a small-cell coverage network). Likewise, in other scenarios, the UEe may already be operating in its HPLMN macro-cell network, and wish to transition to small-cell coverage provided by a VPLMN. Various other combinations are possible as will be recognized by those of ordinary skill given the present disclosure.

At step 1003, the UEe attaches to PLMN-a using its indigenous USIMa credentials. The PLMN-b PGWe 612 provides the APN data using the S8' interface. The subscription record in the PLMN-a HSS 610 indicates which APN needs to be provided.

Next, per step 1004, the UEe "registers" to PLMN-b (its HPLMN), and is assigned an IP address such as from the IMSI/IP DB 615.

Lastly, per step 1005, the UEe connects to the PLMN-a network, and data traffic is transferred to/from the UEe from/to the PGWe 612 in PLMN-b using the assigned IP address.

Figure 10A:
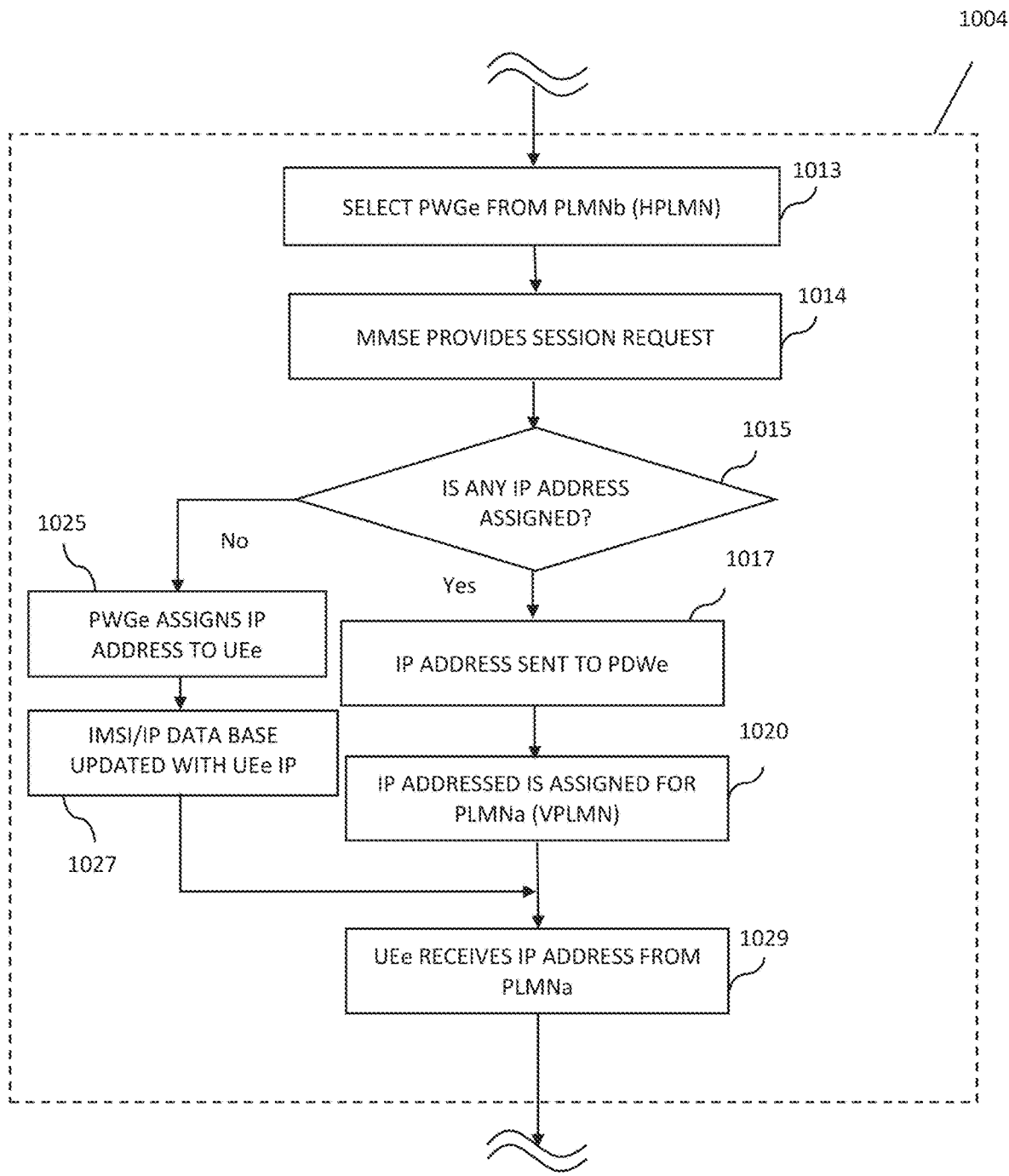
FIG. 10A is a flowchart illustrating a specific implementation of the generalized method of FIG. 10.

Referring now to FIG. 10A, one particular implementation of step 1004 of the method 1000 is shown. Specifically, within step 1004 of the method 1100, a UEe registration procedure is performed.

At step 1013, the PDN GW selection function (in this case, disposed in the MMEa 610) allocates PWGb (the PGWe 612) that provide PDN connectivity and continuity for the 3GPP IP access.

Next, per step 1014, MMEa 610 provides the request via the S8' interface to PGWe 612 in PLMN-b 611. In one embodiment, the multi-USIM UEe's APN, IMEI, and IMSI are included in the S8' interface request.

Next, per step 1015, the PGWe 612 logic searches the IMSI/IP database 615 via the Q1 interface to determine whether an IP address for the requested APN has been assigned to the multi-USIM UEe 511 now within the PLMN-b network.

As a brief aside, the multi-USIM UEe 511 contains IMEIa/IMSIa and IMEIb/IMSIb data associated with USIMa and USIMb, respectively. The enhanced PGW 612 searches the IMSI/IP database 615 using either the relevant IMEI or IMSI as a search criterion, so as to determine whether the multi-SIM UEe 511 has been assigned an IP address associated with the requested APN. An example IMSI/IP DB data structure with two records which relates the various parameters described above is shown in Table 1 below.

TABLE 1

| | IMEIa | IMEIb | IMSIa | IMSIb | APN-x | IP Add. assigned for APN-x | APN-y | IP Add. assigned for APN-y | APN . . . | . . . |
|---|---|---|---|---|---|---|---|---|---|---|
| Record #1 | | | | | | | | | | |
| Record #2 | | | | | | | | | | |

It will be recognized that one or more associations within the data (e.g., IMSIa and IMSIb, or IMEIa and IMEIb) can be based on pre-filling the table/data structure shown above using operations and management (O&M) data or software or processes; e.g., the DB 615 may be linked to an extant MSO O&M process within the MSO's headend which supplies the associated data, such as beased on the subscribers subscription profile maintained by the O&M system.

Next, per step 1017, if the UEe is already assigned an IP address, the IP address will be sent to PDWe 612. The IP address assigned to the multi-USIM UEe notably does not depend on the PLMN.

Next, per step 1020, an IP address assigned to the multi-USIM UEe is used within the VPLMN (PLMN-a) and forwarded to the RRC_Connected UEe to enable establishment of a packet session e.g., in support of a higher-layer application such as VPN.

Conversely, per step 1025, if an IP address is not already assigned to the multi-USIM UEe, the PWGe 612 causes assignment of an IP address to the multi-USIM UEe (whether itself or via a proxy process in data communication therewith).

Next, per step 1027, the IMSI/IP database 615 is updated with the assigned IP address.

Lastly, per step 1029, the multi-USIM UEe receives the IP address (whether previously assigned or newly assigned) from PLMN-a.

Figure 11:
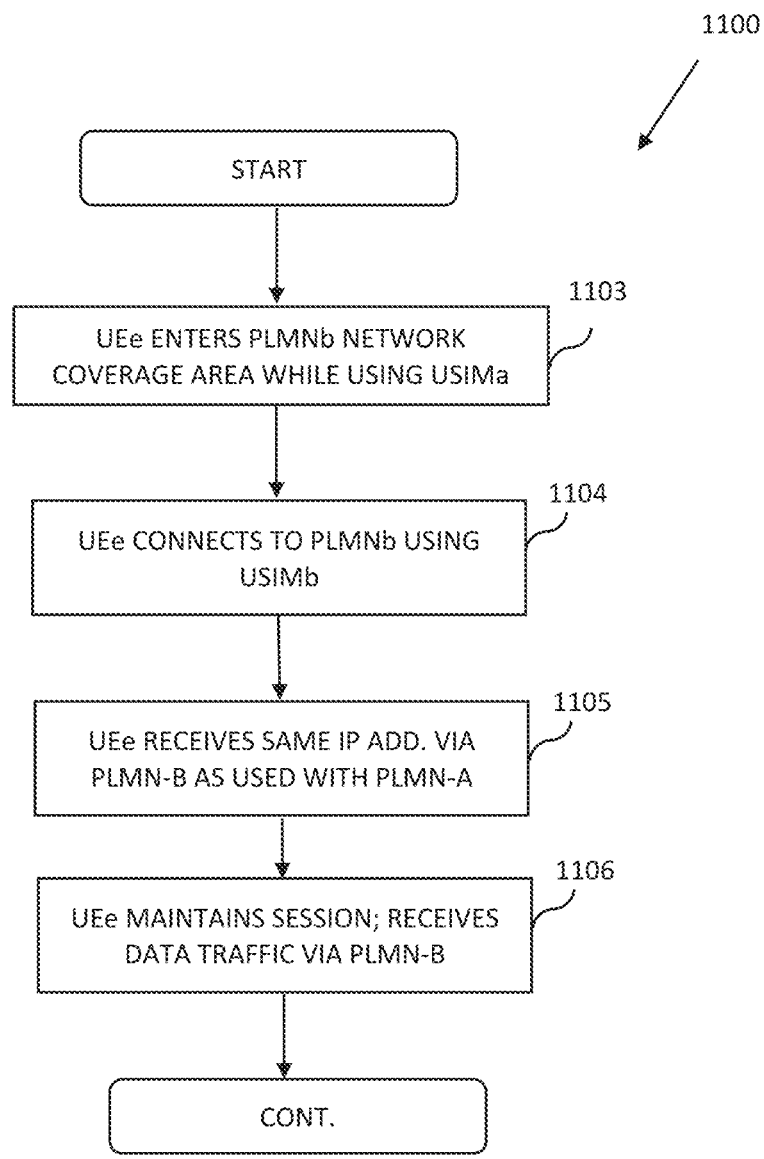
FIG. 11 is a flowchart illustrating a first embodiment of a generalized method for a multi-USIM UE maintaining data session continuity between PLMNs according the present disclosure.

FIG. 11 shows a second embodiment of a generalized method 1100 for seamless roaming of a multi-USIM UEe between two different wireless networks according to the present disclosure. In this instance, the UEe enters into the coverage area of its HPLMN from (while operating in) the VPLMN.

Per step 1103, the UEe 511 enters the coverage area of PLMN-b network while using USIMa for the VPLMN.

Per step 1104, the UEe connects to PLMN-b via the PLMN-b RAN, and is assigned the same IP address as was utilized for any sessions established while in PLMN-a (per step 1105).

Lastly, per step 1106, using the assigned IP address and PLMN-b RAN infrastructure, the IP data traffic is transacted between the UEe and PLMN-b using the same session as established prior to movement of the UEe from the coverage area o PLMN-a to that of PLMN-b.

Figure 11A:
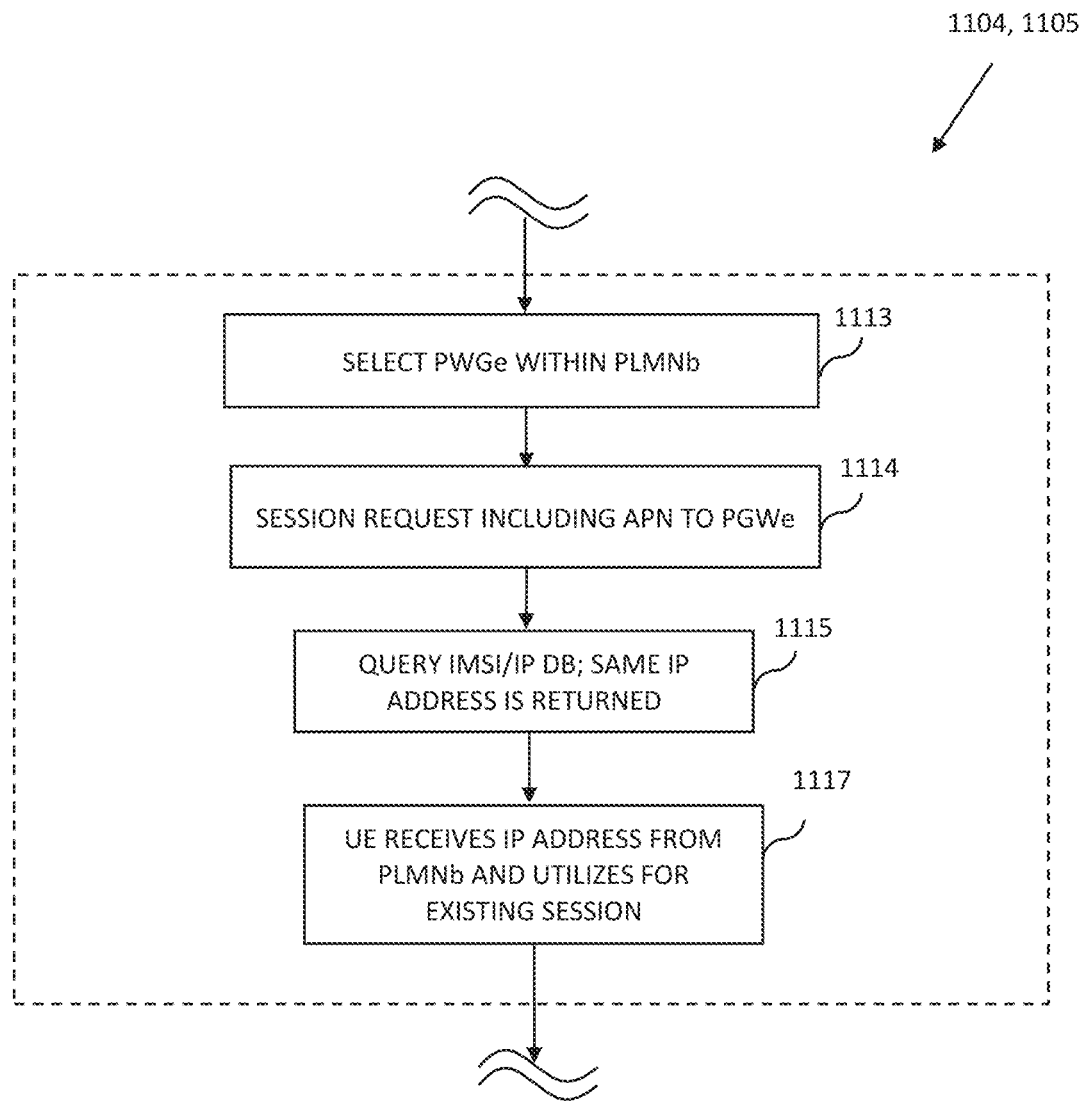
FIG. 11A is a flowchart illustrating a specific implementation of the generalized method of FIG. 11.

Referring now to FIG. 11A, one particular implementation of step 1104 of the method 1100 is shown. Specifically, within steps 1104-1105 of the method 1100, UEe registration within PLMN-b is performed.

At step 1113, the PDN GW selection function allocates the PLMN-b PWGe 612 that provides PDN connectivity for 3GPP packet accesses.

At step 1114, The PLMN-b PGWe receives the session request data from the PLMN-b MME, including the APN.

Next, per step 1115, PGWb searches the IMSI/IP database using IMEIb or IMSIb, and internet APN to find the IP address for the Multi-USIM UEe already allocated for that APN, and the IP address is returned to the PWGe 612.

Next, per step 1117, the multi-USIM UEe is provided the returned IP address (e.g., IP add1 in FIG. 9), and utilizes the IP address for session continuity via its attachment to PLMN-b. At this point, the multi-USIM UEe 511 has two default IP data bearers (i.e., two points of attachment), one towards PLMN-a, and one towards PLMN-b, wherein both bearers have the same IP address (IP add1 in FIG. 9). Therefore, when the UEe roams between PLMN-a and PLMN-b as in the method of FIGS. 10-11A, its IP address does not change, and the applications running on the UEe does not see that the underlying PLMN has switched. In various implementations, both bearers may be maintained by the UEe for use (even though the UEe is only operating in association with say its HPLMN).

2. Paging Procedure in Multi-PLMN Scenarios—

As a brief aside, in 4G or 5G wireless networks, the paging messages issued by an eNB or gNB for a given UE may be sent to the UE to inform of e.g., a pending downlink user data. These messages may be sent while operating in RRC_IDLE and RRC_Connected mode.

However, when a DSDS UEe such as that described herein is in ECM-IDLE mode with respect to both PLMN-a and PLMN-b, the PGW (in the present context, the enhanced PGWe 612 of FIGS. 6 and 7, or the UPFe and SMFe of FIG. 8) is not aware of which PLMN (i.e., PLMN-a or PLMN-b) and associated interface (i.e., S5 or S8') to utilize in order to forward downlink data. Hence, the UEe is required to be informed during such ECM-IDLE mode operation of which PLMN will send the downlink data packets, such as through a paging procedure or other mechanism.

Figure 12A:
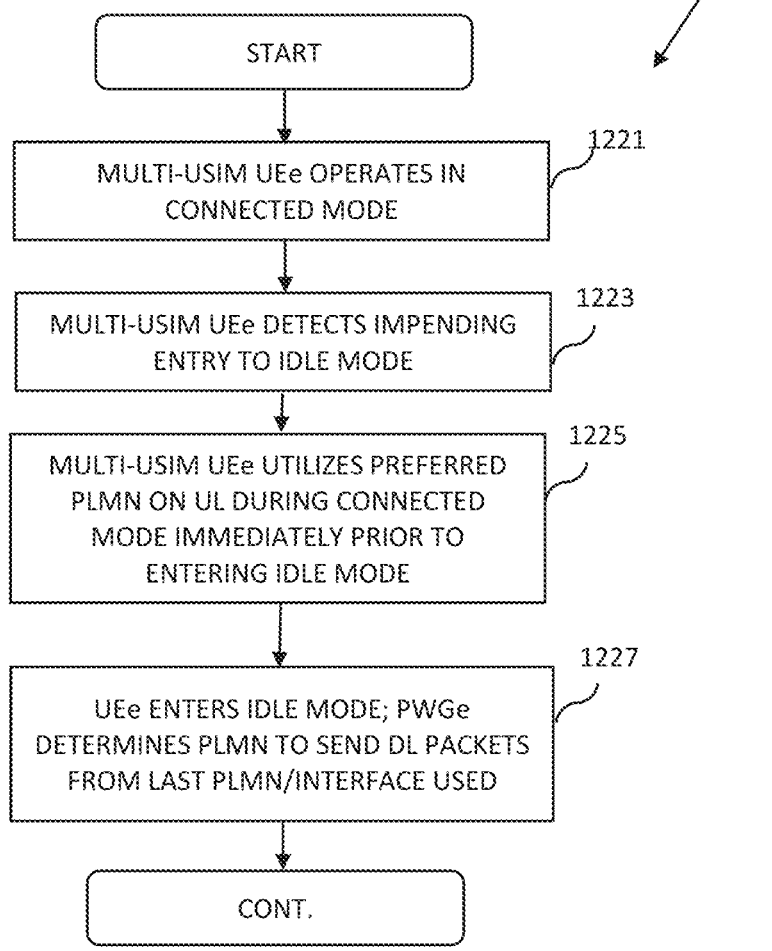
FIG. 12A is a flowchart illustrating a specific implementation for the generalized method of FIG. 12.
Figure 13:
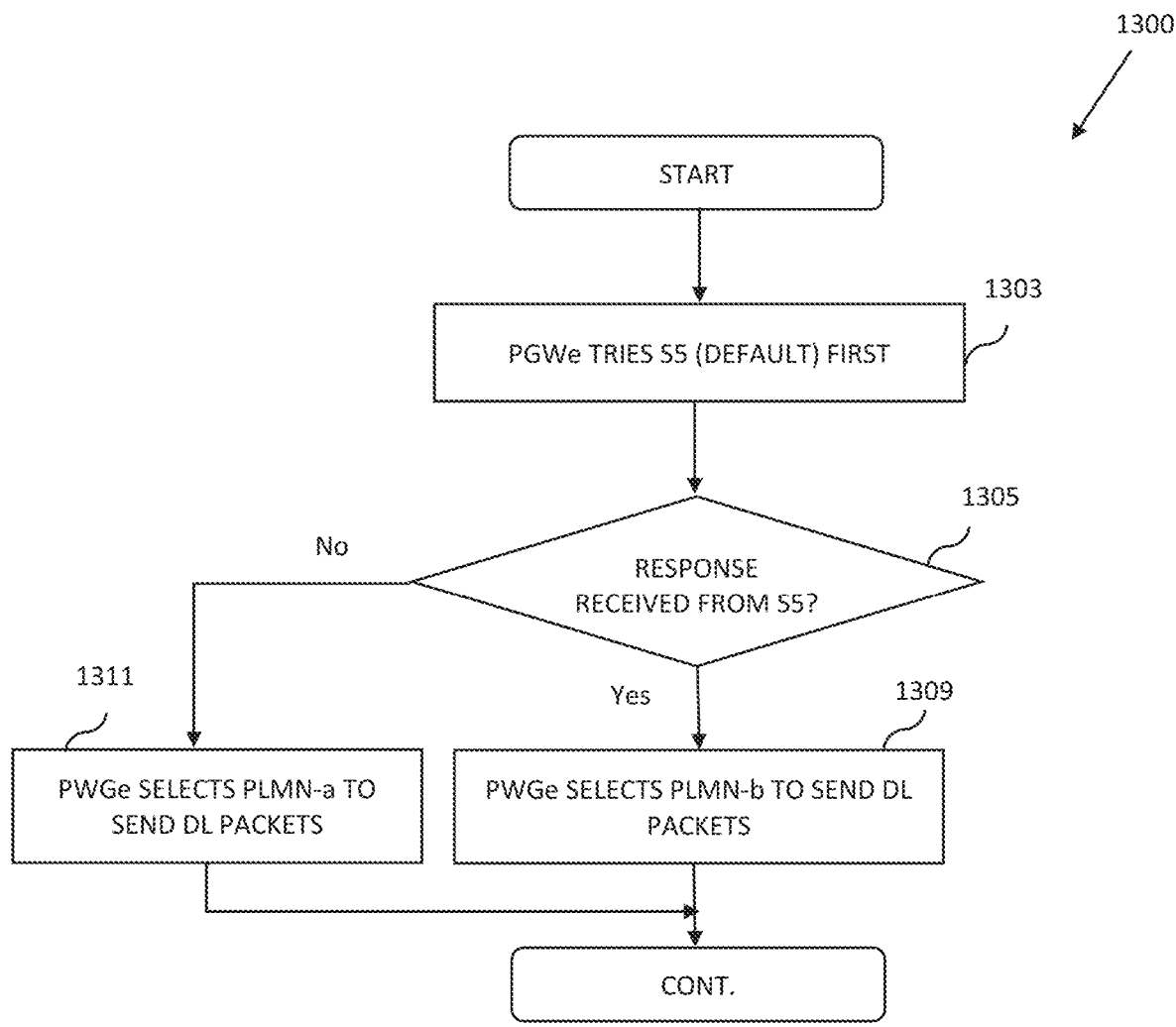
FIG. 13 is a flowchart illustrating a second embodiment of a method for paging a multi-USIM UE roaming between PLMNs according the present disclosure.
Figure 14:
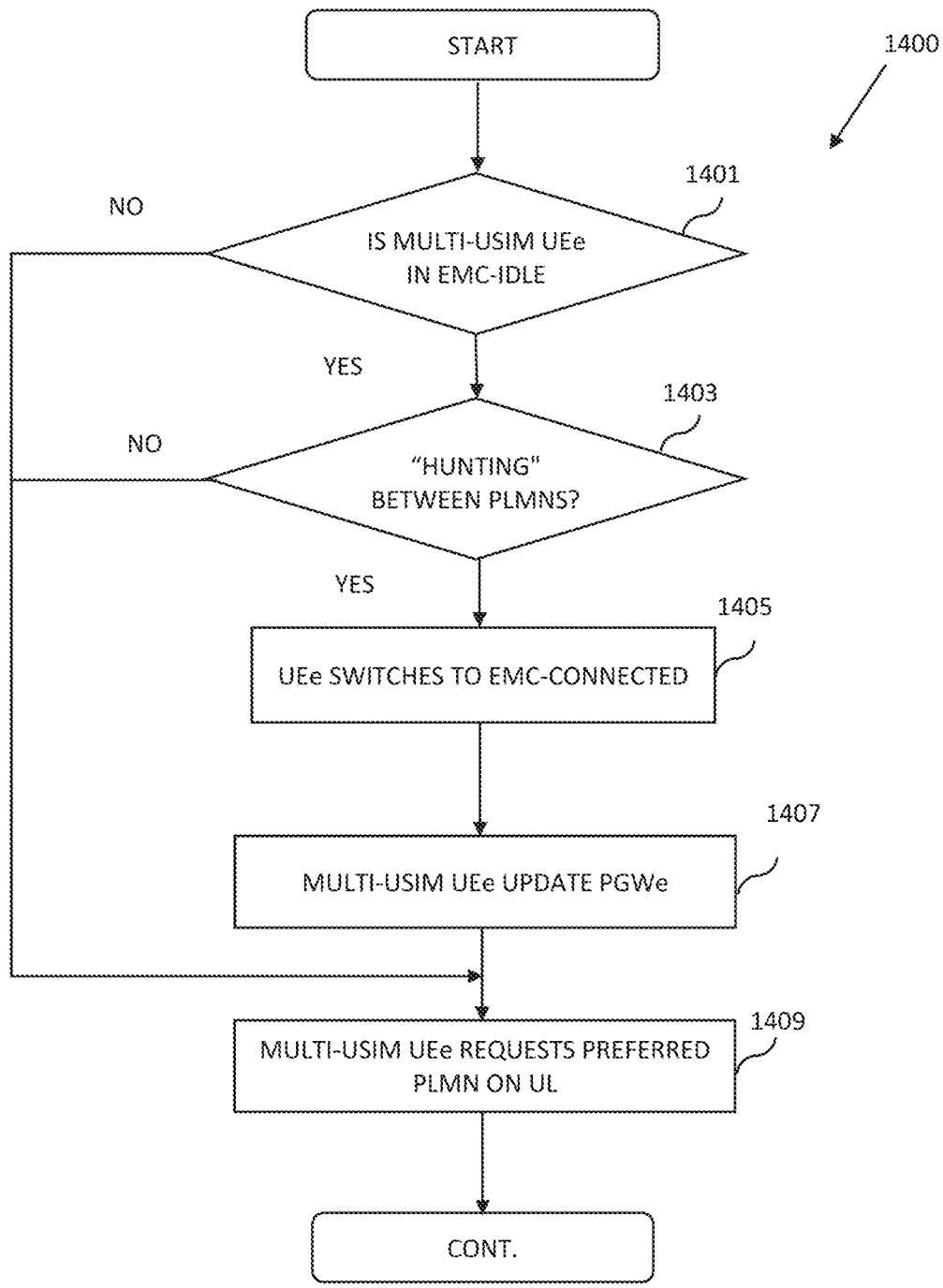
FIG. 14 is a flowchart illustrating one embodiment of a method for preventing paging "hunting" by a multi-USIM UE roaming between PLMNs according the present disclosure.

Accordingly, referring now to FIGS. 12-14, various embodiments of methods of paging a multi-USIM UEe in a multi-PLMN scenario, are shown and described in detail. It will be appreciated that while these methods are described primarily in the context of a 3GPP-based (i.e., E-UTRAN and/or 5G NR) architecture, the various methods are in no way so limited, and may be readily adapted and applied to other types or configurations of wireless such adaptation and application being within the skill level of the ordinary artisan given the present disclosure, including other applications where a UEe or mobile device includes two different USIMs and capability of operation with two different RANs.

FIG. 12 shows a first embodiment of the method for paging a multi-USIM UEe between two different networks (e.g., PLMN-a and PLMN-b), according to the present disclosure. It will be appreciated that while FIG. 12 is described in the context of two 4G networks with respect to the architecture 600 of FIG. 6, the concepts are equally applicable to the architectures 700, 800 of FIG. 7 (4G-5G) and FIG. 8 (5G-5G), respectively.

At step 1201 of the method 1200, the UEe 511 begins in operation in a non-idle mode (e.g., ECM-CONNECTED). As such, the UEe may transmit data to the serving eNB or gNB within the RAN to which it is connected, and is in logical communication with the PGWe 612.

Per step 1203, the multi-USIM UEe 511 affirmatively indicates to the PWGe on its UL channel which PLMN (PLMN-a or PLMN-b) it desires or intends to use to receive downlink packets. This indication may be sent in PCO (Protocol Configuration Option) using UE requested bearer resource modification procedure from UE to the PGWe via the RAN. Note that when the multi-USIM UEe is operating in ECM-CONNECTED mode, it sends the UL data via the active PLMN, and it can switch between PLMN-a or PLMN-b while in transit (i.e., the active PLMN may change with time).

Next, per step 1205, the UEe subsequently enters an idle mode (e.g., ECM-IDLE), wherein it is no longer communicative, and as previously described, the PGWe does know the current context of the UEe (i.e., whether it currently is utilizing PLMN-a or PLMN-b for e.g., paging or other messaging). As such, the PGWe examines the UL message sent by the UEe per step 1203 prior to entering idle mode operation to determine the UEe's preference for receiving DL IP packets. Any such packets are then routed via the selected PLMN to the UEe (e.g., when it exits idle mode).

FIG. 12A shows a second embodiment of the method for paging a multi-USIM UEe between two different networks (e.g., PLMN-a and PLMN-b), according to the present disclosure. Again, while FIG. 12 is described in the context of two 4G networks with respect to the architecture 600 of FIG. 6, the concepts are equally applicable to the architectures 700, 800 of FIG. 7 (4G-5G) and FIG. 8 (5G-5G), respectively.

At step 1221 of the method 1220, the UEe 511 begins in operation in a non-idle mode (e.g., ECM-CONNECTED).

Per step 1223, the UEe detects an impending entry into idle mode (such as via IPC or other messaging intrinsic to the UEe).

Per step 1225, the UEe 511, upon detecting the impending idle state entry, selects a preferred PLMN for UL operations, which is passive or indirect signaling to the PWGe as to which PLMN (PLMN-a or PLMN-b) the UEe desires or intends to use to receive downlink packets. This is in contrast with the active or affirmative message protocol used by in the method 1200 of FIG. 12. In one implementation, the UEe logic may be configured such that any impending idle state entry triggers utilization of the preferred network, or alternatively in other implementations the use of the preferred PLMN may only be triggered in certain cases (e.g., when certain packet-related processes on the UEe are active).

It will be appreciated that in some cases, the UEe may already be on the preferred PLMN, and as such no "switch" to the other PLMN is required. In other cases, the other PLMN may not even be available, and hence the (then) available PLMN is selected as the default bearer when the UEe comes out of idle mode.

Next, per step 1227, the UEe subsequently enters an idle mode (e.g., ECM-IDLE), wherein it is no longer communicative, and as previously described, the PGWe does know the current context of the UEe (i.e., whether it currently is utilizing PLMN-a or PLMN-b for e.g., paging or other messaging). As such, the PGWe examines the PLMN used to send the last UL data from the UEe per step 1225 prior to entering idle mode operation, so as to impute the UEe's preference for receiving DL IP packets. Any such packets are then routed via the identified PLMN to the UEe (e.g., when it exits idle mode).

It is also noted that in some cases, the UEe may be configured such that detection of the impending idem mode entry (step 1223) is not required or used; rather, the PLMN being utilized by the UEe when entry into idle mode is required is selected as the "default" preferred network (since connectivity to that network has already been demonstrated).

FIG. 13 shows a third embodiment of the method for paging a multi-USIM UEe between two different PLMNs (PLMN-a and PLMN-b) according to the present disclosure.

At step 1303, the PWGe first sends DL packets on the S5 interface of PLMN-b (the default) to the multi-USIM UE.

Next, per step 1305, the PWGe checks if a response is received from the multi-USIM UEe on S5. If a response is received, the PGWe selects the PLMN-b (HPLMN in the example of FIG. 6) to utilize as the DL for the subsequent data packets per step 1309.

Alternatively, per step 1311, if no response is received from multi-USIM UEe on the S5 interface, the PWGe selects PLMN-a on which to send subsequent DL packets, based on the assumption that the UEe is not in paging communication with PLMN-b by virtue of no response on the S5 interface.

Figure 13A:
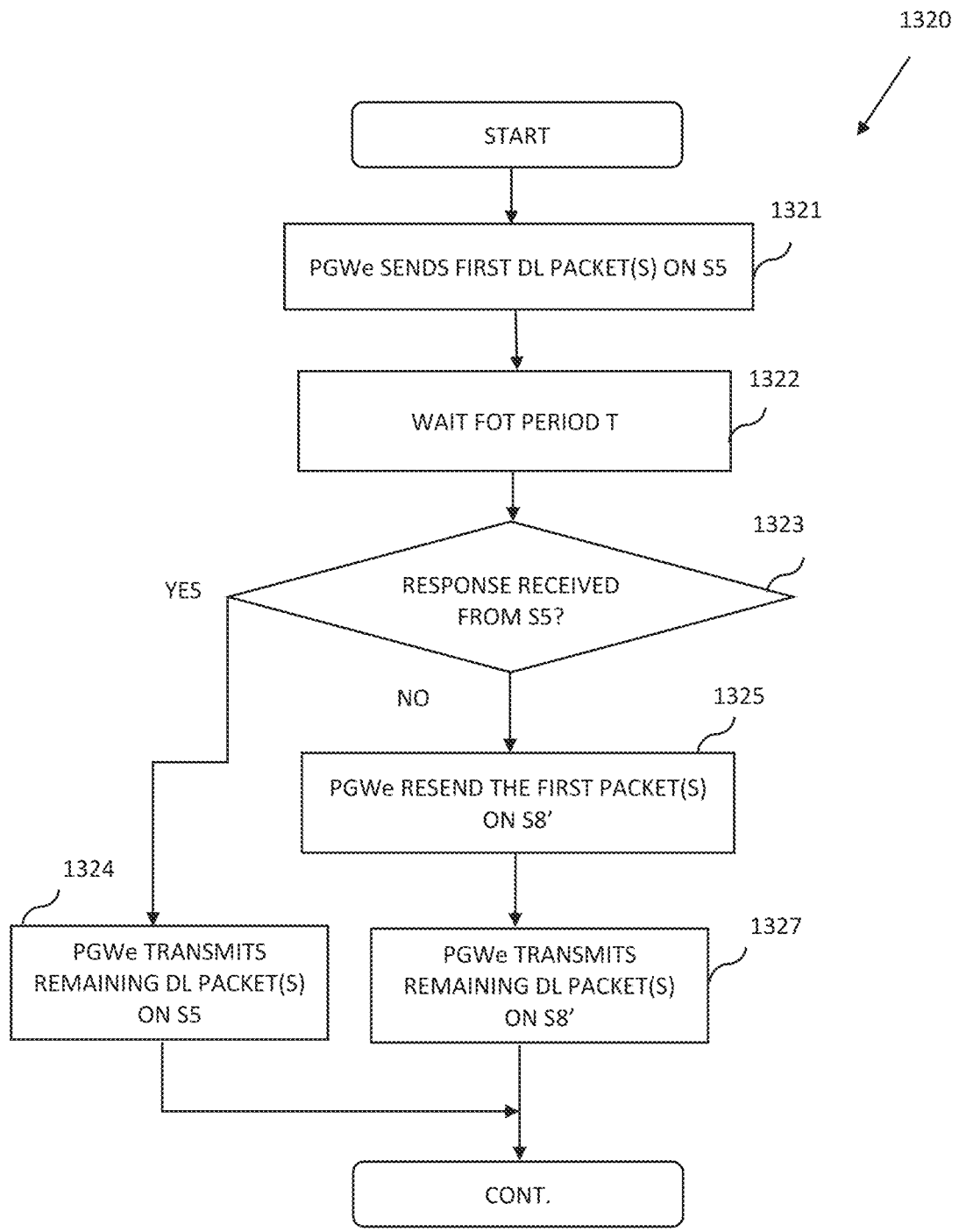
FIG. 13A is a flowchart illustrating a specific implementation for the generalized method of FIG. 13.

FIG. 13A illustrates one variant of the method 1300 of FIG. 13. Specifically, at step 1321 of the method 1320, the PGWe sends a first DL packet (or group of packets) on the S5 (default) interface of the PGWe (i.e., the S5 of PLMN-b) initially.

Next, per step 1322, the PGWe waits for a period T, and then checks if any response received from the multi-USIM UEe at step 1323. If the PWGe receives a response, it proceeds to transmit the remaining downlink packets via the S5 interface of PLMN-b at step 1324.

If the PWGe does not receives a response per step 1323, it sends another "first" DL packet or packets on the PLMN-b to PLMN-a S8' interface (i.e., utilizing the SGW of PLMN-a as a bridge to the RAN of PLMN-a, to which the UEe is presumptively connected) per step 1325, and the follows with the remainder of the DL packets per step 1327.

Alternatively, per step 1324, a response to the initial packet(s) sent on S5 causes transmission of the remainder of the DL packets on S5.

Underlying the methods 1300 and 1320 described above is the assumption that, if the UEe is in PLMN-b's coverage, then the UEe will respond and receive the DL packets via "normal" procedures. However, if UEe is out of PLMN-b's coverage and can only be reached via PLMN-a, then the more complicated processes of using the S8' interface and PLMN-a must be invoked. Accordingly, when using this more complex process, there will be wasted paging resources (as compared to a normal delivery over PLMN-b). There will also be some delay of sending DL packets via PLMN-a (i.e., after the S5 timer has expired per step 1322).

FIG. 14 shows a method for operating a multi-USIM UEe between two different networks (e.g., PLMN-a and PLMN-b) according to the present disclosure.

At step 1401 of the method 1400, it is determined whether the UEe is operating in ECM-IDLE mode. If so, the method proceeds to step 1403, wherein the activity level of the UEe is determined. In this context, the activity level relates to "hunting" or dither between the two networks. For example, if the UEe is highly mobile, and frequently crossing over between coverage of PLMN-a to PLMN-b (the micro-cell network), and back again, significant network and UEe resources may be expended trying to "track down" the UEe at any given point in time. If the UEe is not in idle mode, this is not an issue, since the PLMN to which the UEe is actively connected will know its whereabouts and such data may be passed to the PGWe 612. However, when in idle mode, the UEe could be at either PLMN, and with frequent changes, significant network and UEe resources may be expended constantly determining and updating the UEe association.

Hence, when such hunting or frequent crossover is detected, the UEe is forced per step 1405 into an ECM-CONNECTED mode, whereby the UEe may subsequently update its then-current association to the PGWe (step 1407), and also issue a request or UL message to the PGWe requesting a preferred PLMN for delivery, so as to obviate subsequent hunting when the UEe re-enters idle mode.

Figure 15:
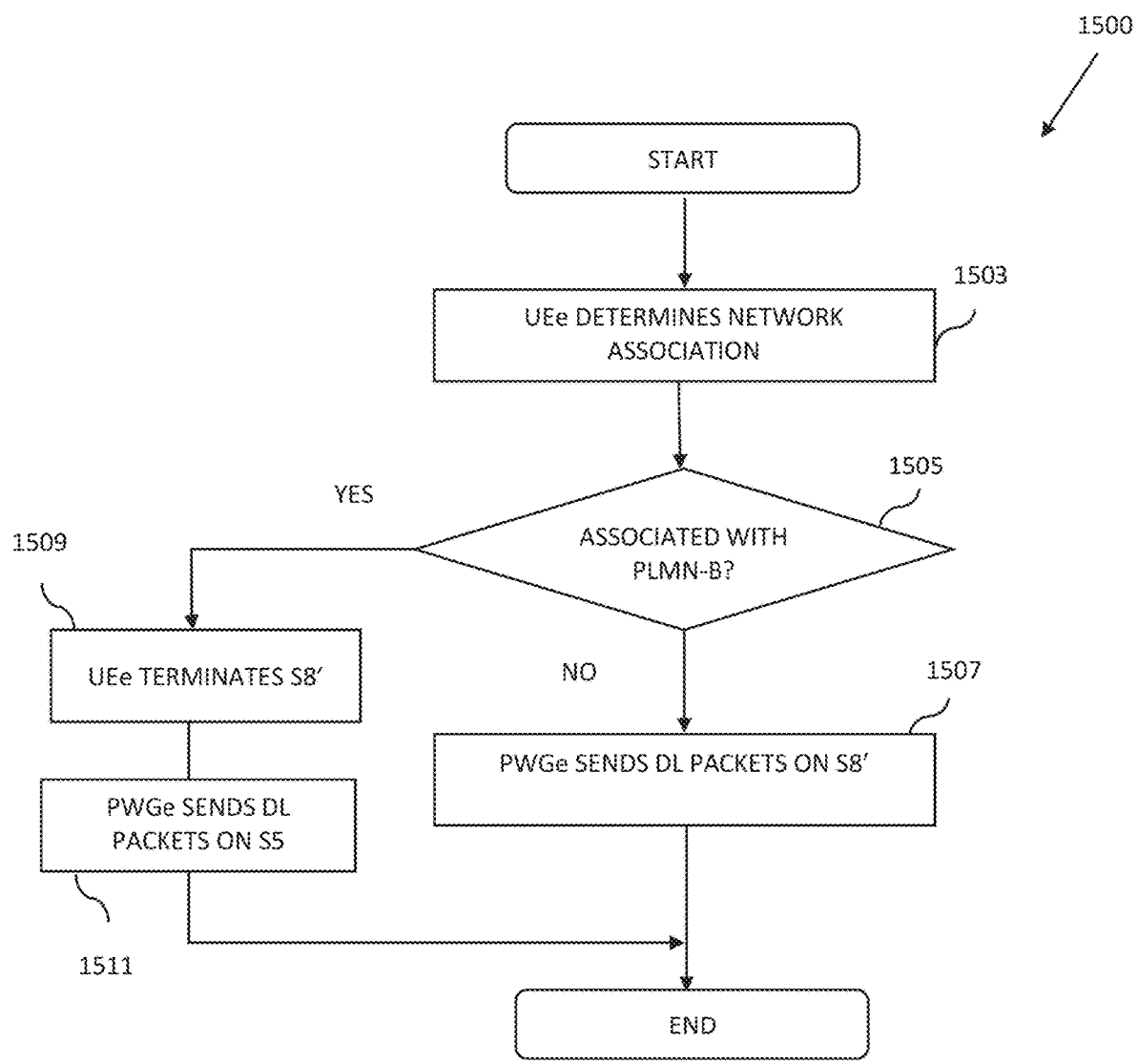
FIG. 15 is a flowchart illustrating another embodiment of a method for operating a multi-USIM UE roaming between PLMNs according the present disclosure.

FIG. 15 shows another embodiment of the method for operating a multi-USIM UEe with respect to two different PLMNs, according to the present disclosure.

At step 1503 of the method 1500, the UEe first determines with which PLMN it is currently associated.

Per step 1505, if the UEe is associated with its home PLMN, the UEe performs a PDN deactivation procedure over PLMN-a (in effect terminating the S8' GTP tunnel associated with the VPLMN per step 1509) when it is under the HPLMN/PLMN-b coverage. This applies to both ECM-IDLE or ECM-CONNECTED UEe in the illustrated embodiment. Per step 1511, the PWGe is then instructed to send the DL packets on the S5 interface to the UEe (such as via detection of the termination messaging of step 1509).

Alternatively, if the UEe is not associated with the HPLMN per step 1505, then the PGWe is instructed to send the DL packets on the S8' interface (i.e., via PLMN-a) per step 1507. In one implementation, the UEe sends a message on the VPLMN UL directed to the PGWe (via S8') indicating the association, thereby enabling the routing of step 1507.

Figure 16:
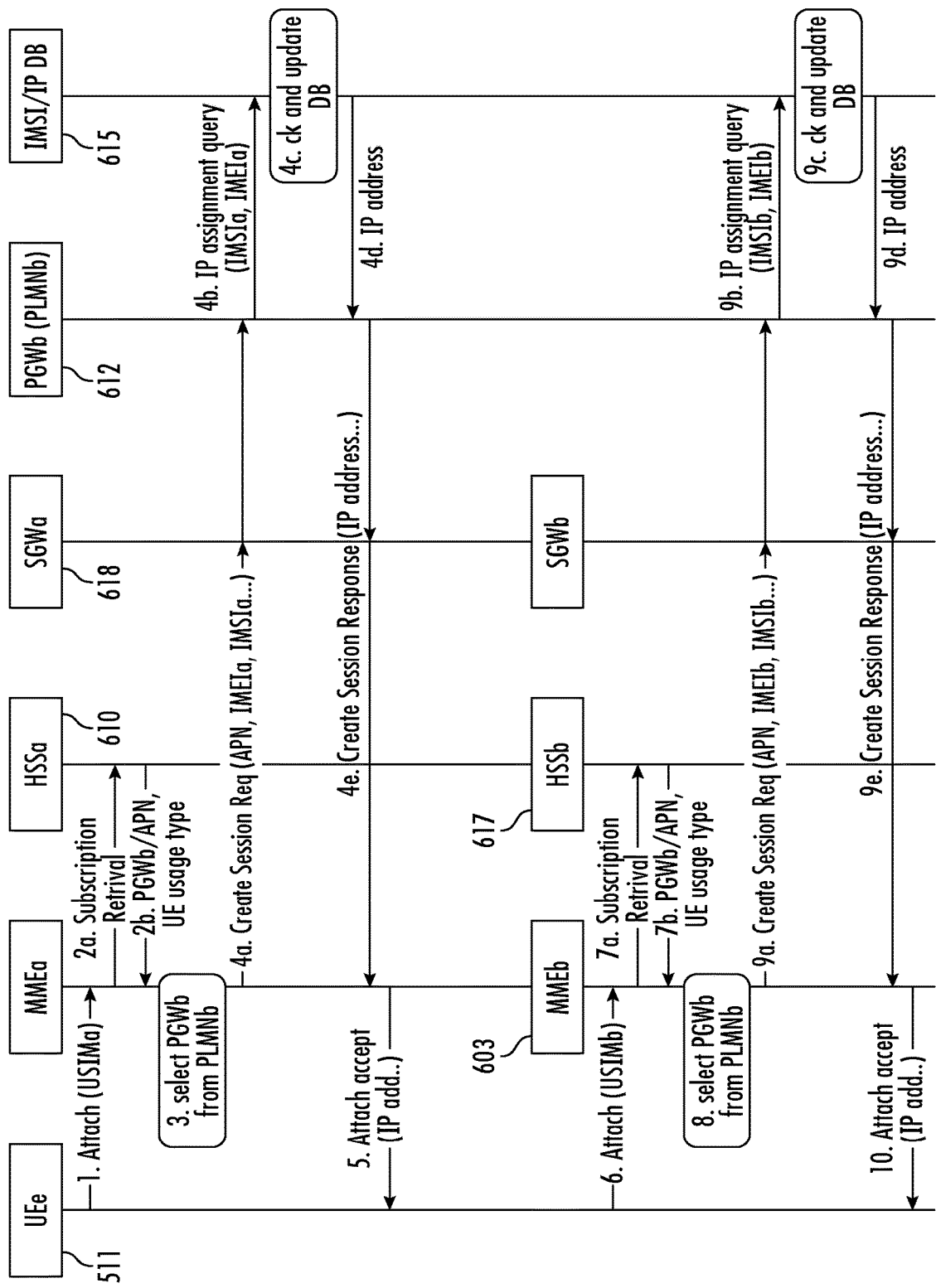
FIG. 16 is a ladder diagram illustrating an exemplary embodiment of a registration procedure for a multi-USIM UE according to the present disclosure.

FIG. 16 is a ladder diagram illustrating exemplary embodiment for seamless roaming and address/session continuity of a multi-USIM UEe, such as between PLMN-a and PLMN-b networks, according to the present disclosure. It will be appreciated that while FIG. 15 illustrates such IP address (and session) continuity across two 4G networks with respect to the architecture 600 of FIG. 6, the concepts are equally applicable to the architectures 700, 800 of FIG. 7 (4G-5G) and FIG. 8 (5G-5G), respectively.

As shown in FIG. 16, the UEe 511 first attaches using USIMa to the VPLMN (PLMN-a), which instigates subscription data retrieval from the HSS 610 by the MME of PLMN-a. The PGW-b APN data (aka the PGWe 612 of PLMN-b) and UEe usage type data are returned to the MME. The MME then creates a session request utilizing the obtained data and requesting IMEI/IMSI of the UEe from the home PLMN (PLMN-a in this example), the request forwarded to the HPLMN's PGWe 612 via the SGW 618 of the VPLMN (and the S8' interface).

The PGWe 612, upon receipt of the request, provides an IP address query to the IMSI/IP DB 615 within the HPLMN. The DB 615 is updated with the assigned IP address and the associated APN, IMEI, IMSI data as shown in Table 1, and the requested data (i.e., IP address) is forwarded back to the PGWe of the HPLMN, which creates a session response to the session request of the MME in the VPLMN that includes the assigned IP address. The attach receipt generated by the MME to the UEe 515 includes this IP address, which will be maintained throughout the subsequent operations.

Next, the UEe 511, via its other USIM, attaches to its HPLMN via the MME 603 thereof (such as when the UEe transitions from macrocell coverage outside of its HPLMN coverage, back into an HPLMN coverage area), and subscription data retrieval, PGW selection, etc. proceeds similar to as previously described for the VPLMN attachment. Note, however, that again the PGWe 612 is chosen as the selected PGW, as in the attachment to the VPLMN. Thus, both VPLMN and HPLMN attachments by the UEe cause selection of the inventive enhanced PGW (PGWe) 612. The HPLMN MME 603, via the HPLMN SGW, requests a session from the PGWe, which accesses the same DB 615 as used by the VPLMN above, and obtains the assigned IP address used in the VPLMN attachment and session establishment. This same address is again provided to the UEe when attaching to the HPLMN, and as such any higher-layer processes within the UEe requiring IP address continuity can advantageously use the same IP address, and hence teardown and re-establishment of the session is avoided.

It will be recognized by those of ordinary skill from the above discussion that the illustrated process of FIG. 16 occurs substantially similarly (e.g., when the UEe transitions from the HPLMN to the VPLMN coverage area), again, IP address and session continuity are maintained through establishment and access of a common IP address (albeit queried via the MME of the HPLMN first, followed by the VPLMN MME entity upon subsequent attachment of the UEe to the VPLMN).

PGWe Apparatus—

Figure 17:
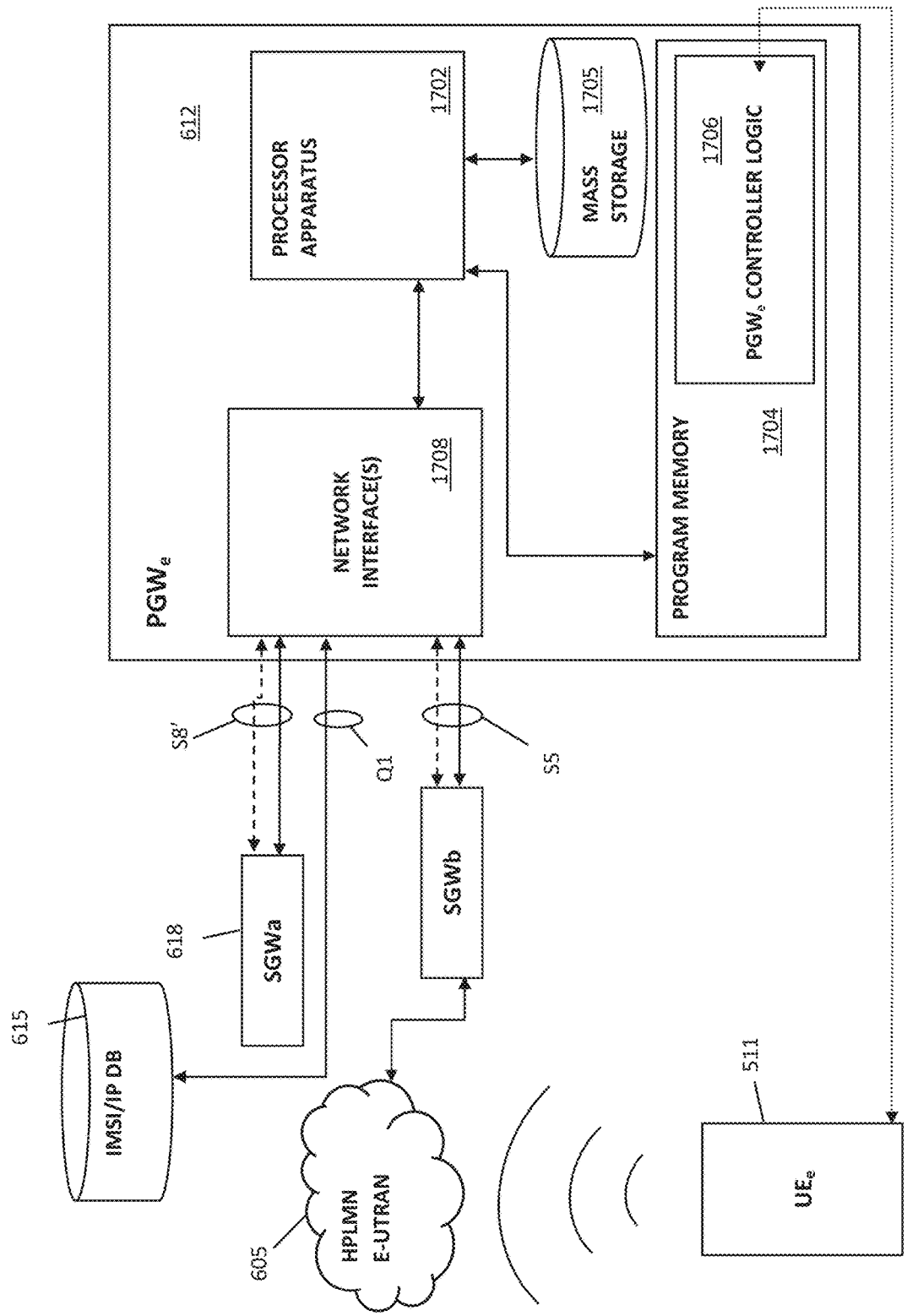
FIG. 17 is a functional block diagram illustrating an exemplary embodiment of an enhanced PWG (PGWe) apparatus useful with various embodiments of the present disclosure.

FIG. 17 illustrates an exemplary configuration of an enhanced PGW (PGWe) 612 according to the present disclosure. As shown, the $PGW_e$ includes, inter alia, a processor apparatus or subsystem 1702, a program memory module 1704, mass storage 1705, a $PGW_e$ Controller Logic module 1706, one or more network interfaces 1708.

In the exemplary embodiment, the processor 1702 may include one or more of a digital signal processor, microprocessor, field-programmable gate array, or plurality of processing components mounted on one or more substrates. The processor 1702 may also comprise an internal cache memory, and is in communication with a memory subsystem 1704, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1702.

The network interfaces 1708 are configured to comply with the relevant standards which the $PGW_e$ supports (e.g., 3GPP 4G/4.5G or others as applicable) in the service area of the E-UTRAN 605, including the S5 interface to the HPLMN SGW, S8' interface to the VPLMN SGW, and the Q1 interface to the IMSI/IP DB.

The processing apparatus 1702 is configured to execute at least one computer program stored in memory 1704 (e.g., a non-transitory computer readable storage medium); in the illustrated embodiment, such programs include $PGW_e$ controller logic 1706, such as to implement the relevant portions of the methods of FIGS. 10-15 herein. The PGWe controller logic 1706 is in one variant a firmware or software module that, inter alia, communicates with a corresponding $UE_e$ logic portion (i.e., for message exchange and protocol implementation—see FIG. 18), and/or other upstream or backend entities such as the VPLMN SGW 618.

In some embodiments, the $PGW_e$ logic 1706 utilizes memory 1704 or other storage 1705 configured to temporarily hold a number of data relating to the various UEe's (including UEe IP address, IEMI, IMSI, etc. in conjunction with the IMSI/IP DB 615) for the various functions described herein including UEe authentication and registration, session establishment, receipt/processing of UL transmissions relating to current UEe status and PLMN preferences, etc.). It will be appreciated that while the data structure of Table 1 supra is in some embodiments maintained within the IMSI/IP DB 615 as previously described, it may also be maintained locally by the PGWe 612. In other embodiments, application program interfaces (APIs) such as those included in an MSO-provided application or those natively available on the PGW$_e$ may also reside in the internal cache or other memory 1704. Such APIs may include common network protocols or programming languages configured to enable communication with the PGWe 612 and other network entities (e.g., via API "calls" to the PGW$_e$ by MSO network processes tasked with gathering load, configuration, subscriber, or other data).

The PGW$_e$ may further be configured to directly or indirectly communicate with one or more authentication, authorization, and accounting (AAA) servers of the network, such as via the interface 1708 shown in FIG. 17 and an MSO backhaul (e.g., where the PGW$_e$ is disposed within the MSO infrastructure). The AAA servers, whether locally maintained by the MSO or remotely by e.g., an MNO of the subscriber, are configured to provide services for, e.g., authorization and/or control of network subscribers (including roaming MNO "visitors" to the MSO RAN(s), and/or roaming MSO subscribers visiting an SPLMN of an MNO) for controlling access and enforcing policies, auditing usage, and providing the information necessary to bill for services.

UEe Apparatus—

Figure 18:
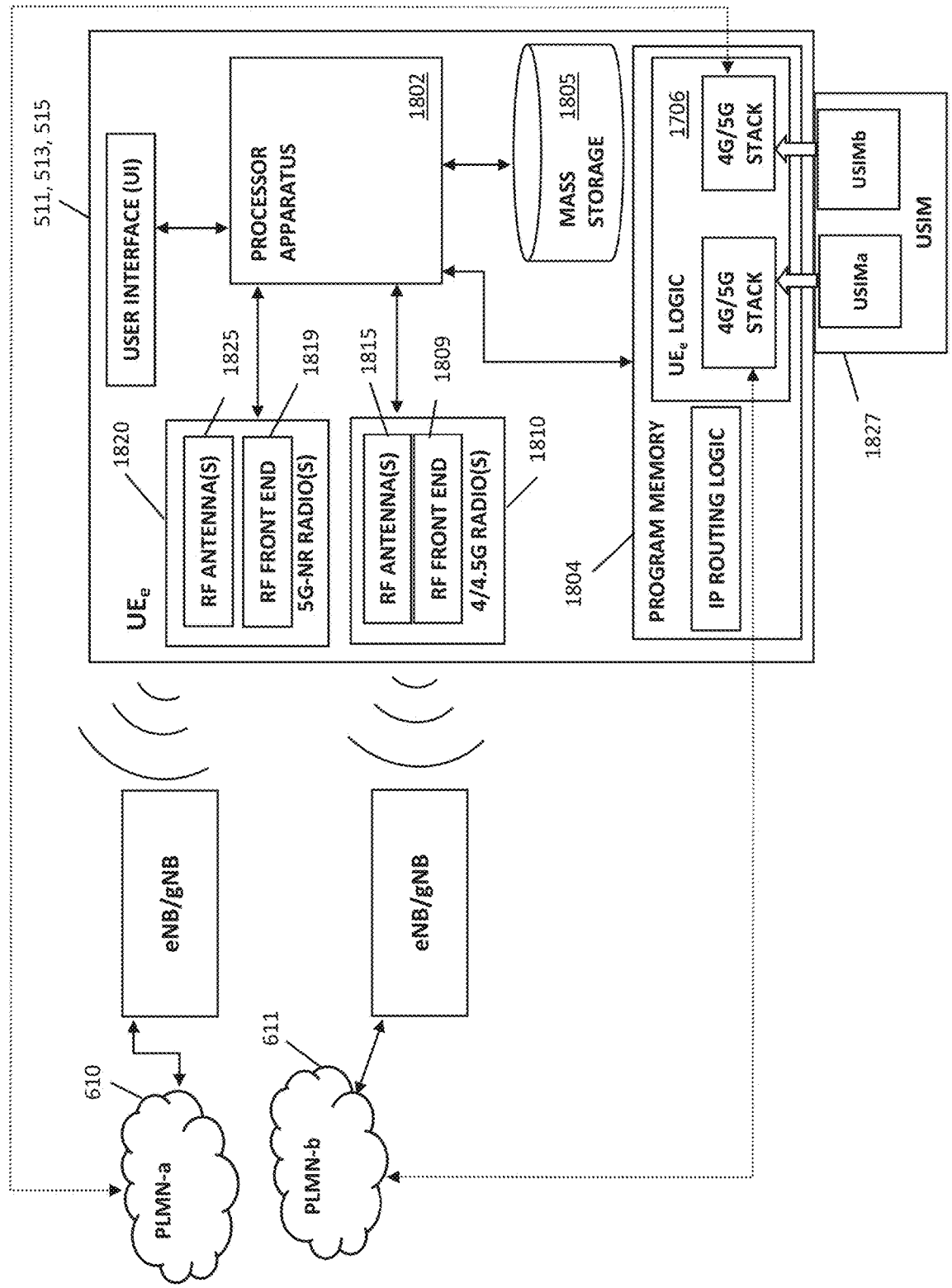
FIG. 18 is a functional block diagram illustrating an exemplary embodiment of an enhanced 3GPP-compliant multi-USIM apparatus (UEe) useful with various embodiments of the present disclosure.

FIG. 18 illustrates a block diagram of an exemplary embodiment of a UE$_e$ 511, 513, 515 apparatus, useful for operation in accordance with the present disclosure.

In one exemplary embodiment as shown, the UE$_e$ includes, inter alia, a processor apparatus or subsystem 1802, a program memory module 1804, UE$_e$ logic 1806 (here implemented as software or firmware operative to execute on the processor 1802), and wireless interfaces 1810, 1820 for communications with the relevant RANs (e.g., 4G/4.5G E-UTRAN and 5G-NR RAN, respectively). The RF interfaces 1810, 1820 are each configured to comply with the relevant PHY standards which it supports. The antenna(s) 1815, 1825 of the UE$_e$ radios may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 1802 may include one or more of a digital signal processor, microprocessor, field-programmable gate array, or plurality of processing components mounted on one or more substrates. The processor apparatus 1802 may also comprise an internal cache memory. The processing subsystem is in communication with a program memory module or subsystem 1804, where the latter may include memory which may comprise, e.g., SRAM, flash and/or SDRAM components. The memory module 1804 may implement one or more of direct memory access (DMA) type hardware, so as to facilitate data accesses as is well known in the art. The memory module of the exemplary embodiment contains one or more computer-executable instructions that are executable by the processor apparatus 1802. A mass storage device (e.g., HDD or SSD, or NAND/NOR flash or the like) is also provided as shown.

The processor apparatus 1802 is configured to execute at least one computer program stored in memory 1804 (e.g., the logic of the UEe including enhanced functions of DRM and multi-RAN (and PLMN) registration and operation, in the form of software or firmware that implements the various functions described herein). Other embodiments may implement such functionality within dedicated hardware, logic, and/or specialized co-processors (not shown).

Also included in the UE$_e$ 511, 513, 515 is a USIM apparatus 1827, which is configured to securely store (and provide ancillary processing related to), which enables the UE$_e$ to register within the two separate networks (e.g., PLMN-a and PLMN-b, respectively in FIG. 6). In one embodiment, the 4G/5G GUTIs are received by the UE$_e$ pursuant to registration/attach procedures, and stored within the USIM 1827 in respective storage elements thereof (e.g., SE's or cryptographically secure elements).

In some embodiments, the UE$_e$ logic 1806 also utilizes memory 1804 or other storage 1805 configured to temporarily hold a number of data relating to the various PLMN lists, PLMN associations for the various services/applications such as voice, etc.) for the various functions described herein. It will be appreciated that while the data structure of Table 1 supra is in some embodiments maintained within the IMSI/IP DB 615 as previously described, it may also be maintained locally by the PGWe 612, and even portions thereof within the memory of the UEe.

In other embodiments, application program interfaces (APIs) such as those included in an MSO-provided application or those natively available on the UE$_e$ may also reside in the internal cache or other memory 1704. Such APIs may include common network protocols or programming languages configured to enable communication with the UE$_e$ and other network entities (e.g., via API "calls" to the UE$_e$ by MSO network processes tasked with gathering load, configuration, usage of PLMNs, or other data). As an aside, a downloadable application or "app" may be available to subscribers of an MSO or cable network (and/or the general public, including MSO "partner" MNO subscribers), where the app allows users to configure their UEe via the UI to implement enhanced functionality, including data collection and reporting back to the MSO core network so as to enable, inter alia, service/RAN availability when roaming, congestion, or other attributes which may be useful in implementing e.g., the methodologies of FIGS. 10-15 discussed above. Application program interfaces (APIs) may be included in MSO-provided applications, installed with other proprietary software that comes prepackaged with the UE$_e$. Alternatively, the relevant MNO may provide its subscribers with the aforementioned functionality (e.g., as a pre-loaded app on the UE$_e$ at distribution, or later via download), or as a firmware update to the UE$_e$ stack conducted OTA.

Other applications making use of e.g., IP data sessions, such as VPN apps, VoIP apps, banking apps, and similar (as described in greater detail below) may also be installed and operative on the UEe.

Service Provider Networks

Figure 19:
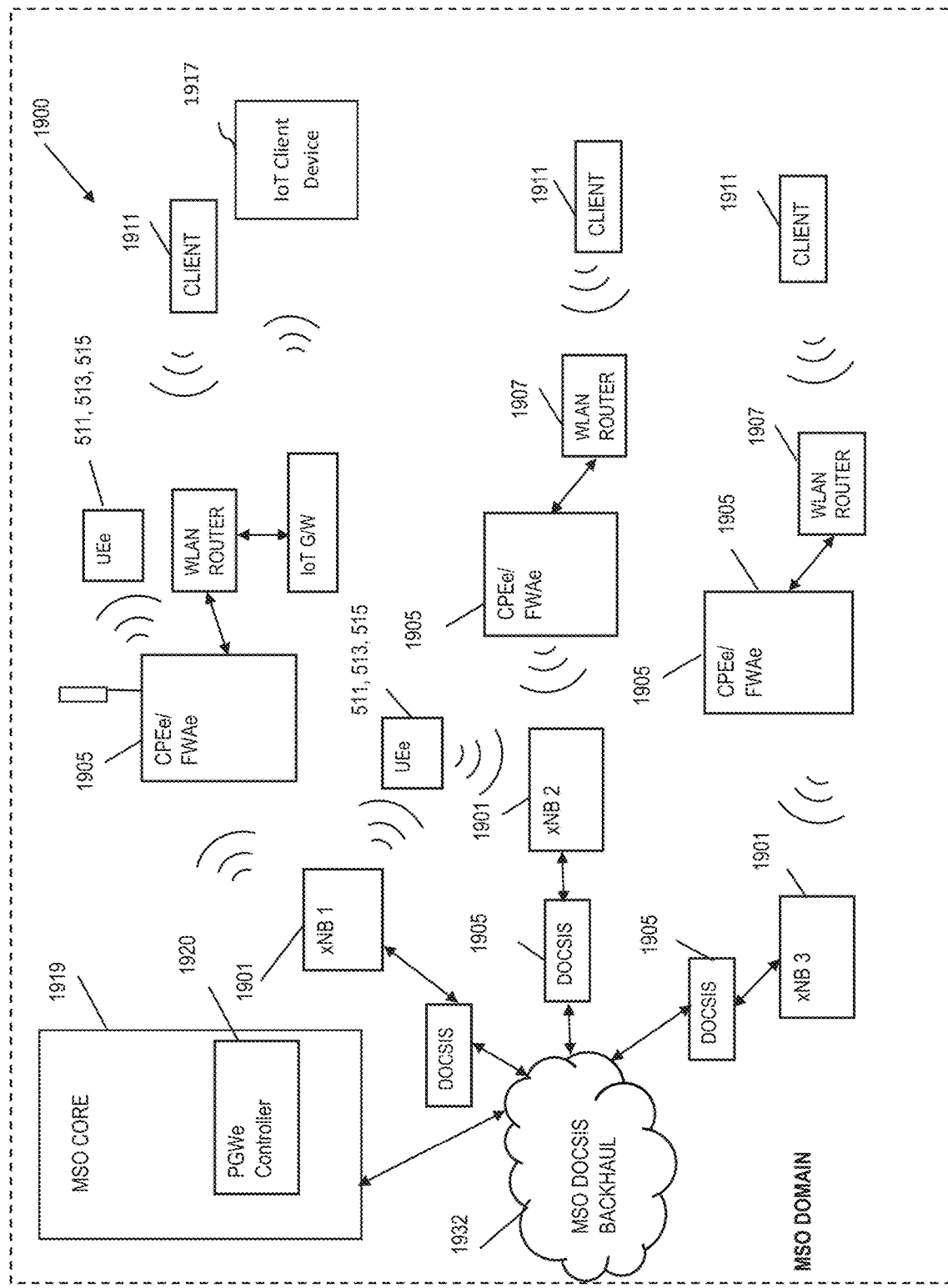
FIG. 19 is a functional block diagram of a first exemplary MSO network architecture useful in conjunction with various principles described herein.

FIG. 19 illustrates a typical service provider network configuration useful with the features of the apparatus and methods described herein. It will be appreciated that while described with respect to such network configuration, the methods and apparatus described herein may readily be used with other network types and topologies, whether wired or wireless, managed or unmanaged.

The exemplary service provider network 1900 is used in the embodiment of FIG. 19 to provide backhaul and Internet access from the service provider's wireless access nodes (e.g., eNB, gNB or Node B NR-U) devices, Wi-Fi APs, and FWA devices operated or maintained by the MSO), and one or more stand-alone or embedded DOCSIS cable modems (CMs) 1933 in data communication therewith. It will be appreciated that the xNB and UEe devices described herein may operate on licensed, unlicensed, or quasi-licensed/shared access spectrum while utilizing the underlying 3GPP 4G/5G NR/NR-U based protocols described herein.

The individual xNB's 1901 are backhauled by the CMs 1905 to the MSO core via e.g., CMTS or CCAP MHAv2/RPD or other such architecture, and the MSO core 1932 includes at least some of the EPC/5GC core functions previously described, as well as an optional PGWe/SMF-e/UPFe controller process 1920 as shown. The controller process is in one embodiment a network-based server which communicates with the various PGWe 612 within the MSO infrastructure so as to effect various functions, including those of FIGS. 10-15 as previously described. The controller 1920 can communicate with the PGWe's via the interfaces between the core and the individual PGWe/SMF-c/UPFe. The PGWe/SMF-e/UPFe devices may also be configured to fail to their internal logic when communication with the network controller process is lost, in effect self-moderating for decisions of IP address and HPLMNNPLMN selection management modes and operation.

While not shown, it will also be appreciated that the logic of the UEe relating to "home routing" operation may also be communicative with and controlled at least in part by the network controller 1920 in some embodiments, such as via established connections between the UEe and one or more xNB's.

Client devices 1911 such as tablets, smartphones, Smart-TVs, etc. at each premises are served by respective WLAN routers 1907, IoT gateways 1917, and NR-U or CBRS capable CPE/FWA 1905, the latter which are backhauled to the MSO core or backbone via their respective xNB's, and which themselves may be enhanced with home routing management capability to act in effect as fixed UEe. While such devices may not be mobile as in the exemplary UEe 511, 513, 515 previously described, they may reside within the operational areas of two PLMNs (e.g., an MSO PLMN or small-cell PLMN served by e.g., CBRS or NR-U-enabled 3GPP CBSDs or gNBs, and an MNO macrocell network), and as such may selectively operate within both networks in the event the fixed UE include DSDS/dual-USIM capability. As such, the present disclosure contemplates servicing of any number of different configurations of UEe including both mobile and fixed devices, and a number of possible RAN and PLMN configurations (including femt-cell and small-cell "micro" PLMNs maintained by multiple different subscribers or enterprises, including those operating within or adjacent to coverage areas of MSO or MNO macrocells.

Notably, in the embodiment of FIG. 19, all of the necessary components for support of the wireless service provision and backhaul functionality are owned, maintained and/or operated by the common entity (e.g., cable MSO). The approach of FIG. 19 has the advantage of, inter alia, giving the MSO complete control over the entire service provider chain so as to optimize service to its specific customers (versus the non-MSO customer-specific service provided by an MNO), and the ability to construct its architecture to optimize incipient 5G NR functions such as network slicing, gNB DU/CU Option "splits" within the infrastructure, selection or configuration of subsets or groups of gNB (or their individual DU) which can participate in coordinated UEe PLMN selection and utilization management, RRC connection processes, etc.

Figure 20:
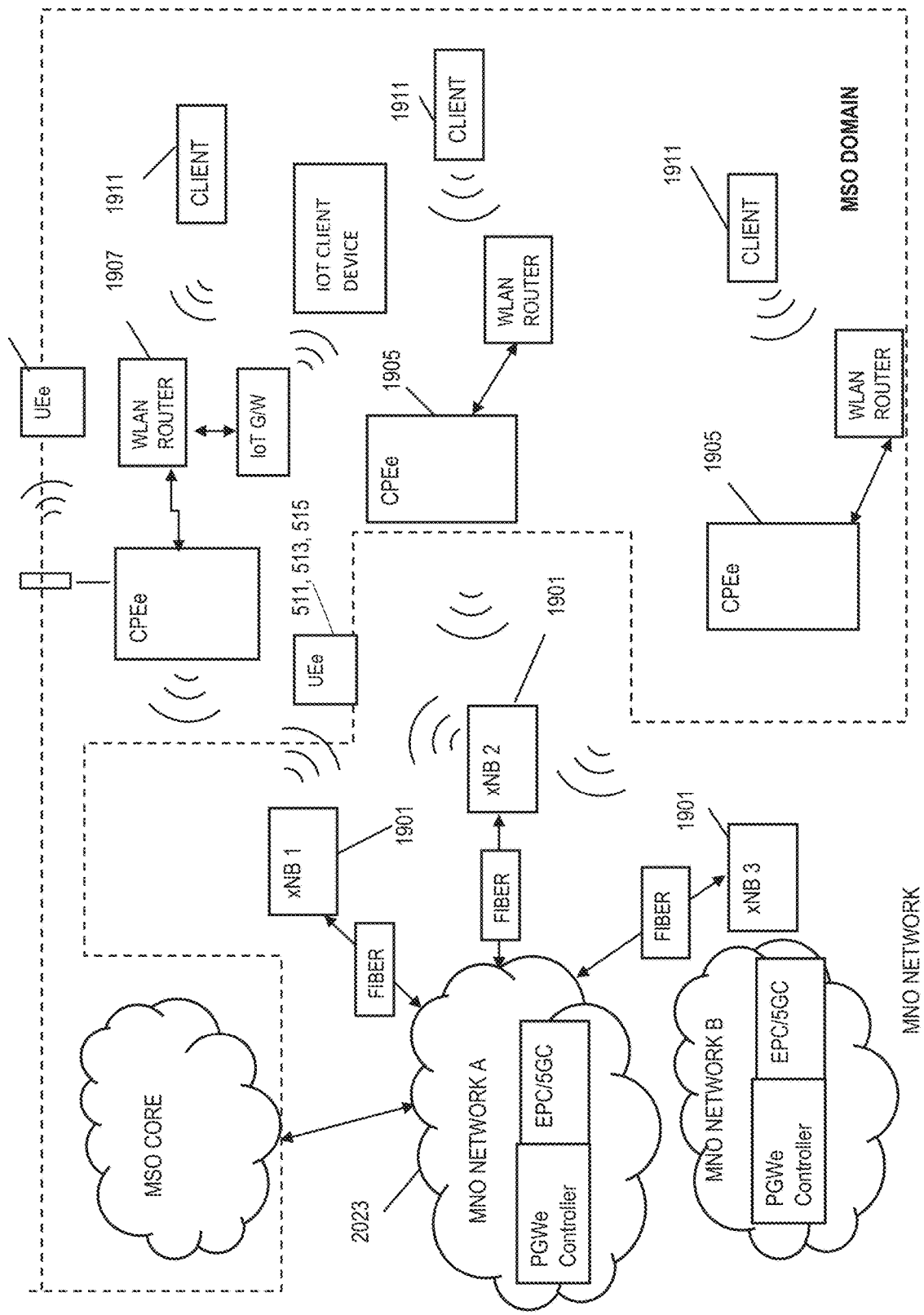
FIG. 20 is a functional block diagram of an exemplary MNO network architecture useful in conjunction with various principles described herein, wherein respective portions of the infrastructure are managed or operated by the MSO and one or more MNOs.

FIG. 20 illustrates another embodiment, highlighting one possible relationship between an MSO architecture and an MNO architecture. As shown, the MSO service domain extends only to the CPEe/FWAe and served premises and the MSO core functions, while other functions such as 3GPP EPC/E-UTRAN or 5GC and NG-RAN functionality, as well as PGWe/SMF-e/UPFe and controller functions if utilized, are provided by one or more MNO networks 2032 operated by MNOs (may belong to the same or different operators), including in some embodiments with which the MSO has a service agreement. In this approach, the controller server 1920 is maintained and operated by the MNO (since the MNO maintains cognizance over the PGWe/SMF-e/UPFe devices), although this is not a requirement, and the present disclosure contemplates embodiments where the controller function is maintained by the MSO or even a third party. The approach of FIG. 20 (i.e., coordination of MSO and MNO networks) has the advantage of, inter alia, avoiding more CAPEX by the MSO, including duplication of infrastructure which may already service the area of interest, including reduced RF interference due to addition of extra (and ostensibly unnecessary) xNB's or other transceivers.

Hence, depending on what data is useful to the MSO or its customers, various portions of the foregoing can be associated and stored to particular xNB "clients" or their components being backhauled by the MSO network, whether owned by the MSO, MNO, or another entity. These data can also be utilized by e.g., the controller or another network process in IP data session and home routing management processes for MUSIM UEe's within the infrastructure such as based on operational loading of a given xNB or the network as a whole, UEe location relative to the xNB's, subscriber account or subscription level or privileges, presence of other suitable backhauls for the UEe such as WLAN, 5G NR network slicing considerations, and/or yet other factors which will be recognized by those of ordinary skill in the wireless infrastructure arts given the present disclosure.

Exemplary Enabled Applications

It will be appreciated that the foregoing systems, methods and apparatus disclosed herein may be used to support any number of network and end-user applications with enhanced performance and user experience in addition to those previously described (e.g., MNO/MSO enterprise applications).

As but one example, banking applications (e.g., via an app operative to execute on the user's UEe) often uses IP Security (e.g., IPsec) between the client device (UEe) and the server (e.g., a remote or Internet-based banking IT center). As such, under the prior art, when a multi-USIM UE moves across PLMNs (e.g., switching from USIM A to USIM B), the necessary change of IP address will not allow the multi-USIM UEe to maintain the IPsec tunnel with the remote server, and this causes service disruption with the user. Hence, the user has to reset the application, and restart a new client log-in procedure to reestablish a new IPsec tunnel. This can be extremely frustrating, especially when the user is constantly moving. In contrast, using the approaches described herein, any transitions from one PLMN to another (regardless of direction, either HPLMN to VPLMN, or vice versa) is completely transparent to the banking application, and complete session continuity and security can be maintained.

Another application able to leverage the enhanced capabilities disclosed herein relates to provision of an aggregated total packet count (or used data quota) to a user from both participating PLMNs. For example, if the multi-USIM UEe is not allowed to use more than 1 GB of data per month regardless from which PLMN (e.g., VPLMN or HPLMN), a warning message (e.g, SMS text) or other notification mechanism should be invoked when the quota is within e.g., 10% of the limit. As such, the disclosure herein provides solution on how this can be implemented properly when different PLMNs are utilized (i.e., the designated PGWe or SMF-e/UPFe can be used to provide "integrated" packet counts for both networks.

Yet another application enhanced by the solutions described herein is network sharing. As previously described, the extant network sharing model (e.g. 4G/5G) uses a single USIM. Network sharing models with DSDS UEe are not defined. As but one example, in the scenarios where a new 5G MNO (i.e., an MNO initiating 5G network coverage) has spotty or incomplete area coverage under such new network, may seek to supplement this incomplete coverage through use of an inventive DSDS UEe of the type described herein, in effect leasing 4G/LTE macrocell network coverage from a third party in order to provide "fallback" (4G) coverage for its subscribers when they are outside of the 5G coverage areas. Using the solutions provided herein, these subscribers with DSDS UEe can seamlessly transition between the 5G MNO network coverage and the "fallback" 4G coverage with no loss of session continuity; roaming is effectively seamless even though the networks of two different operators are employed.

Additional Considerations

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computerized network apparatus for use within a first wireless network infrastructure, comprising:
   a packet data network process having computerized logic, the computerized logic configured to selectively utilize, when processing packet data associated with a user device capable of wireless connection to both the first wireless network infrastructure and a second wireless network infrastructure:
      a first packet data interface in communication with the first wireless network infrastructure; or
      a second packet data interface in communication with the second wireless network infrastructure;
   wherein the selective utilization is based at least in part on a determination of which of the first wireless network infrastructure and the second wireless network infrastructure that the user device is then-currently associated with, the determination based on (i) a determination that the user device is in an idle mode and (ii) an activity level of the user device that is associated with dither between two or more wireless networks, wherein the activity level of the user device that is associated with the dither between the two or more wireless networks causes the user device to switch from the idle mode to a connected mode, such that the user device can indicate to the packet data network process which of the first wireless network infrastructure or the second wireless network infrastructure with which the user device is then-currently associated.

2. The computerized network apparatus of claim 1, wherein:
   the first packet data interface in communication with the first wireless network infrastructure comprises a data interface to a gateway function of the first wireless network infrastructure;
   the second packet data interface in communication with the second wireless network infrastructure comprises a data interface to a gateway function of the second wireless network infrastructure;
   the first wireless network infrastructure comprises a home network of the user device; and
   the second wireless network infrastructure comprises a visited network of the user device.

3. The computerized network apparatus of claim 2, wherein a coverage area of the home network of the user device is at least partly subsumed or contained within a coverage area of the visited network of the user device.

4. The computerized network apparatus of claim 1, wherein:
   the first wireless network infrastructure comprises a small-cell network operated by a first type of network operator; and
   the second wireless network infrastructure comprises a macrocell cellular network operated by a second type of network operator, the second type different than the first type.

5. The computerized network apparatus of claim 1, further comprising computerized logic configured to access, via a data interface between the computerized network apparatus and a database apparatus, the database apparatus of the first wireless network infrastructure, the access enabling the computerized network apparatus to perform an IP (Internet Protocol) address lookup function relative to the user device.

6. The computerized network apparatus of claim 1, wherein:
   the first wireless network infrastructure comprises a 3rd Generation Partnership Project (3GPP) Fifth Generation (5G) NR (New Radio) compliant Public Land Mobile Network (PLMN); and
   the second wireless network infrastructure comprises a 3GPP Long Term Evolution (LTE) compliant Public Land Mobile Network (PLMN).

7. The computerized network apparatus of claim 1, wherein:
   the first wireless network infrastructure comprises a first 3rd Generation Partnership Project (3GPP) Long Term Evolution (LTE) compliant Public Land Mobile Network (PLMN); and the second wireless network infrastructure comprises a second 3GPP Long Term Evolution (LTE) compliant Public Land Mobile Network (PLMN).

8. The computerized network apparatus of claim 7, wherein:
the first packet data interface in communication with the first wireless network infrastructure comprises an S5 data interface to a serving gateway (SGW) function of the first wireless network infrastructure;
the second packet data interface in communication with the second wireless network infrastructure comprises an S8-based data interface to an SGW function of the second wireless network infrastructure; and
the computerized network apparatus comprises a Packet Data Network Gateway (PGW) function of the first wireless network infrastructure.

9. The computerized network apparatus of claim 1, wherein:
the first wireless network infrastructure comprises a 3GPP 5G NR (New Radio) compliant Public Land Mobile Network (PLMN); and
the second wireless network infrastructure comprises a second 3GPP 5G NR (New Radio) compliant Public Land Mobile Network (PLMN).

10. The computerized network apparatus of claim 1, wherein:
the first wireless network infrastructure comprises a wireless network infrastructure operated by a multiple systems operator (MSO), the user device comprising a user device associated with a subscriber of the MSO; and
the second wireless network infrastructure comprises a wireless network infrastructure operated by a mobile network operator (MNO).

11. The computerized network apparatus of claim 10, wherein:
the first wireless network infrastructure comprises a small-cell network infrastructure, and the second wireless network infrastructure comprises a macro-cell network infrastructure; and
a coverage area of a radio area network (RAN) of the small-cell network infrastructure is at least partly subsumed or contained within a coverage area of a RAN of the macro-cell network infrastructure.

12. A computerized method of servicing a wireless user device configured for wireless connection to both a first wireless network and a second wireless network, the computerized method comprising:
determining an association of the wireless user device with one of the first wireless network and the second wireless network;
utilizing computerized logic to select, based at least on the determining, one of (i) a first packet data interface in communication with the first wireless network, or (ii) a second packet data interface in communication with the second wireless network; and
processing packet data associated with the wireless user device based at least on the selected one of the first packet data interface or the second packet data interface;
wherein:
the determining the association is based at least on the wireless user device being in an idle mode and exhibiting dither between two or more wireless networks; and
the determining further comprises causing the wireless user device to switch from the idle mode to a connected mode, such that the wireless user device can indicate to a computerized network packet processing entity a preferred one of the first wireless network or the second wireless network with which to associate.

13. The computerized method of claim 12, further comprising:
receiving, at a computerized packet data process of the second wireless network, data representative of a request for first data session, the data representative of the request initiated from the wireless user device operating within the first wireless network;
based at least in part on the request for the first data session, causing assignment of a first network address to the wireless user device;
causing provision of the assigned first network address to the wireless user device, the provided assigned first network address enabling the wireless user device to establish the first data session;
receiving, at the computerized packet data process of the second wireless network, data representative of a second request for a second data session, the data representative of the second request initiated from the wireless user device operating within the second wireless network; and
utilizing the first network address for responding to the second request.

14. The computerized method of claim 13, further comprising:
transacting data with the wireless user device while operating within the second wireless network via the second data session; and
terminating the first data session thereafter.

15. The computerized method of claim 13, further comprising:
transacting data with the wireless user device while operating within the second wireless network via the second data session; and
maintaining the first data session thereafter for at least a period of time;
wherein both the first and second data sessions can be used to support a packet data application executing on the wireless user device.

16. The computerized method of claim 13, wherein:
the receiving, at the computerized packet data process of the second wireless network, of the data representative of the request for the first data session initiated from the wireless user device operating within the first wireless network comprises receiving the first data session at a packet data network gateway process of the second wireless network, the packet data network gateway process in data communication with a database comprising data correlating one or more wireless user device identifiers with one or more IP addresses, and access point identifier data; and
the causing of the assignment of the first network address to the wireless user device comprises causing assignment of an Internet Protocol (IP) address accessed via the database based at least in part on an identifier of the wireless user device.

17. The computerized method of claim 12, wherein the utilizing of the computerized logic to select, based at least on the determining, the one of (i) the first packet data interface in communication with the first wireless network, or (ii) the second packet data interface in communication with the second wireless network, comprises selecting, at a packet data network gateway (PGW) function of the second wireless network, one of (i) an S8-based data interface to a serving gateway (SGW) function of a first 3rd Generation Partnership Project (3GPP) Long Term Evolution (LTE) compliant Public Land Mobile Network (PLMN), or (ii) an S5-based data interface to an SGW function of a second 3GPP LTE compliant PLMN.

18. The computerized method of claim 12, wherein the processing of the packet data comprises:
   transmitting at least one downlink packet of the packet data on the first packet data interface; and
   executing second computerized logic configured to:
   (i) based on receipt of a response from the wireless user device on the first packet data interface, transmit one or more remaining downlink packets of the packet data on the first packet data interface; and
   (i) based on non-receipt of the response from the wireless user device on the first packet data interface within a prescribed period of time from the transmitting of the at least one downlink packet, transmit the at least one downlink packet or at least one other downlink packet of the packet data on the second packet data interface.

19. Computer readable apparatus comprising a non-transitory storage medium, the non-transitory storage medium comprising at least one computer program having a plurality of instructions, the plurality of instructions configured to, when executed on a processing apparatus, cause a computerized network packet processing entity to:
   identify either a first wireless network or a second wireless network with which a wireless user device is then-currently associated, the wireless user device capable of wireless connection to both the first wireless network and the second wireless network; and
   select, based at least on the identification, one of (i) a first packet data interface in communication with the first wireless network, or (ii) a second packet data interface in communication with the second wireless network, for at least one of a transmission of packet data or receipt of the packet data;
   wherein the identification of either the first wireless network or the second wireless network with which the wireless user device is then-currently associated comprises, based on (i) a determination that the wireless user device is in an idle mode and (ii) an activity level of the wireless user device that is associated with dither between two or more wireless networks, a causation of the wireless user device to switch from the idle mode to a connected mode, such that the wireless user device can indicate to the computerized network packet processing entity at least one of: (i) which of the first wireless network or the second wireless network with which the wireless user device is then-currently associated, or (ii) a preferred one of the first wireless network or the second wireless network to associate with.

20. The computer readable apparatus of claim 19, wherein:
   the first packet data interface in communication with the first wireless network comprises a first air interface apparatus configured for wireless communication with a first radio area network (RAN) via use of a first wireless access technology;
   the second packet data interface in communication with the second wireless network comprises a second air interface apparatus configured for wireless communication with a second radio area network (RAN) via use of a second wireless access technology;
   the wireless user device comprises first and second subscriber identity modules (SIMS) associated with the first and second RANs, respectively; and
   the computerized network packet processing entity comprises a packet data network gateway (PGW) of the first wireless network.

21. The computer readable apparatus of claim 19, wherein:
   the selection, based at least on the identification, of the one of (i) the first packet data interface in communication with the first wireless network, or (ii) the second packet data interface in communication with the second wireless network, for the transmission or the receipt of the packet data, comprises selection of the first packet data interface in communication with the first wireless network for receipt, from the wireless user device, of the packet data; and
   the plurality of instructions are further configured to, when executed on the processing apparatus, cause the computerized network packet process to:
   receive data configured to indicate a network preference for the transmission of the packet data to the wireless user device; and
   based at least on the network preference, select the second packet data interface in communication with the second wireless network for the transmission of the packet data to the wireless user device.

* * * * *